US010759019B2

(12) United States Patent
Takahashi et al.

(10) Patent No.: US 10,759,019 B2
(45) Date of Patent: *Sep. 1, 2020

(54) END POINT DETECTION METHOD, POLISHING APPARATUS, AND POLISHING METHOD

(71) Applicant: EBARA CORPORATION, Tokyo (JP)

(72) Inventors: Taro Takahashi, Tokyo (JP); Yuta Suzuki, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 186 days.

This patent is subject to a terminal disclaimer.

(21) Appl. No.: 15/508,034

(22) PCT Filed: Aug. 27, 2015

(86) PCT No.: PCT/JP2015/074254
§ 371 (c)(1),
(2) Date: Mar. 1, 2017

(87) PCT Pub. No.: WO2016/035673
PCT Pub. Date: Mar. 10, 2016

(65) Prior Publication Data
US 2017/0282325 A1   Oct. 5, 2017

(30) Foreign Application Priority Data

Sep. 2, 2014 (JP) ................................ 2014-177742
May 15, 2015 (JP) ................................ 2015-099643

(51) Int. Cl.
*B24B 37/013* (2012.01)
*B24B 49/10* (2006.01)
(Continued)

(52) U.S. Cl.
CPC .......... *B24B 37/013* (2013.01); *B24B 37/042* (2013.01); *B24B 37/046* (2013.01);
(Continued)

(58) Field of Classification Search
CPC ... B24B 37/013; B24B 37/042; B24B 37/046; B24B 49/10; B24B 49/16
(Continued)

(56) References Cited

U.S. PATENT DOCUMENTS 5,846,882 A    12/1998  Birang
6,190,494 B1 *  2/2001  Dow ..................... B24B 37/013
                                        156/345.13
(Continued)

FOREIGN PATENT DOCUMENTS

JP         H10-177976 A      6/1998
JP         10-180625 A       7/1998
(Continued)

OTHER PUBLICATIONS

International Patent Application No. PCT/JP2015/074254; Int'l Search Report; dated Nov. 17, 2015; 1 page.

*Primary Examiner* — Eileen P Morgan
(74) *Attorney, Agent, or Firm* — BakerHostetler

(57) ABSTRACT

An end point detection method is provided for detecting an end point based on a drive current supplied to a drive unit that rotates and drives one of a polishing table and a holding unit. The end point detection method includes: a step (S102) of determining whether a polishing condition of a polishing process to be executed coincides with a preset specific polishing condition; a step (S103) of adjusting a current control parameter in a drive control unit that controls the drive current, the current control parameter related to a change in the drive current with respect to a change in a driving load of the drive unit, if it is determined that the polishing condition coincides with the specific polishing condition; and a step (S105) of detecting the drive current supplied to the drive unit based on the adjusted current control parameter.

8 Claims, 17 Drawing Sheets

(51) Int. Cl.
*B24B 49/16* (2006.01)
*B24B 37/04* (2012.01)
*G01S 13/50* (2006.01)

(52) U.S. Cl.
CPC .............. *B24B 49/10* (2013.01); *B24B 49/16* (2013.01); *G01S 13/50* (2013.01)

(58) Field of Classification Search
USPC .......................................... 451/5, 10, 11, 41
See application file for complete search history.

(56) References Cited

U.S. PATENT DOCUMENTS

| | | | | |
|---|---|---|---|---|
| 6,340,434 B1* | 1/2002 | Mizuno | ................ | B24B 37/013 216/38 |
| 6,547,637 B1* | 4/2003 | Zhang | ................ | B24B 37/013 451/10 |
| 7,189,139 B2* | 3/2007 | Ono | ........................ | B24B 49/10 451/11 |
| 9,132,525 B2* | 9/2015 | Shinozaki | ............... | B24B 49/16 |
| 9,272,389 B2* | 3/2016 | Takahashi | ............. | B24B 37/013 |
| 9,757,838 B2* | 9/2017 | Shinozaki | ............. | B24B 37/013 |
| 2007/0108066 A1* | 5/2007 | Tsai | ........................ | B23H 5/08 205/641 |
| 2008/0081541 A1 | 4/2008 | Kozasa et al. | | |
| 2010/0015889 A1 | 1/2010 | Shimizu et al. | | |
| 2014/0094098 A1* | 4/2014 | Shinozaki | ............... | B24B 49/16 451/287 |
| 2015/0343594 A1* | 12/2015 | Shinozaki | ............. | B24B 37/013 451/5 |
| 2017/0106493 A1* | 4/2017 | Takahashi | ............... | B24B 37/20 |
| 2017/0282325 A1 | 10/2017 | Takahashi et al. | | |

FOREIGN PATENT DOCUMENTS

| | | |
|---|---|---|
| JP | 2001-198813 A | 7/2001 |
| JP | 2005-034992 A | 2/2005 |
| JP | 2014-069255 A | 4/2014 |
| JP | 2014-069256 A | 4/2014 |
| JP | 2014069256 A * | 4/2014 |
| JP | 5863614 B2 * | 2/2016 |
| TW | 200827659 A | 7/2008 |
| TW | I331067 B | 10/2010 |

* cited by examiner

| | SETTING VALUE | Max | Min |
|---|---|---|---|
| AMPLIFICATION | x10 | 200 | 100 |
| OFFSET | -100 | 100 | 0 |
| FILTER | | ATTENUATION AT FILTER | 0 |
| SECOND AMPLIFICATION | CORRECTION OF PORTION ATTENUATED AT FILTER | 100 | 0 |

END POINT DETECTION METHOD, POLISHING APPARATUS, AND POLISHING METHOD

CROSS-REFERENCE TO RELATED APPLICATIONS

The present disclosure is a 371 U.S. National Stage Application of Patent Application No. PCT/JP2015/074254 filed in Japan on Aug. 27, 2015, which claims priority to Japanese Patent Application Nos. 2014-177742, filed on Sep. 2, 2014, and 2015-099643, filed on May 15, 2015. The entire contents of which are hereby incorporated by reference.

TECHNICAL FIELD

The present invention relates to an end point detection method, a polishing apparatus and a polishing method.

BACKGROUND ART

In recent years, as the packing densities of semiconductor devices are becoming higher, wires of circuits are becoming finer and the distances between the wires are also becoming narrower. It is necessary to planarize the surface of a semiconductor wafer that is a polishing target, and polishing by a polishing apparatus is performed as one method of carrying out such planarization.

A polishing apparatus includes a polishing table for holding a polishing pad for polishing a polishing target, and a top ring for holding a polishing target and pressing the polishing target against the polishing pad. The polishing table and the top ring are each rotationally driven by a driving portion (for example, a motor). A liquid (slurry) that includes a polishing agent is caused to flow on the polishing pad, and the polishing target that is held by the top ring is pushed against the polishing pad to thereby polish the polishing target.

If the polishing of a polishing target by a polishing apparatus is insufficient, a problem arises such as the risk of a short-circuit occurring due to insulation between circuits not being achieved, while if excessive polishing is performed, problems arise such as an increase in resistance values due to a reduction in the cross-sectional area of the wiring, or the wiring itself is completely removed and the circuit itself is not formed. Therefore, it is necessary for a polishing apparatus to detect the optimal polishing endpoint.

As one polishing endpoint detection means, a method is known that detects a change in a polishing frictional force when polishing has transitioned to a substance that is made of a different material. A semiconductor wafer as a polishing target has a laminated structure made of different materials including a semiconductor material, a conductive material and an insulating material, and the coefficient of friction differs between the different material layers. Therefore, the aforementioned method detects a change in the polishing frictional force that is caused by the polishing transitioning to a different material layer. According to this method, a time at which the polishing reaches a different material layer is the endpoint of the polishing.

A polishing apparatus can also detect a polishing endpoint by detecting a change in a polishing frictional force when the polishing surface of the polishing target becomes flat from a state in which the polishing surface was not flat.

A polishing frictional force that arises when polishing a polishing target appears as the driving load of a driving portion. For example, in a case where a driving portion is an electrically-driven motor, a driving load (torque) can be measured as a current that flows to the motor. Therefore, the motor current (torque current) can be detected with a current sensor, and the endpoint of polishing can be detected based on a change in the detected motor current. Examples of such a technique include techniques described in Japanese Patent Application Laid-Open Publication No. 2005-34992 and Japanese Patent Application Laid-Open Publication No. 2001-198813.

SUMMARY OF INVENTION

Technical Problem

However, a polishing process executed by the polishing apparatus includes a plurality of polishing conditions based on combinations of the type of polishing target, the type of polishing recipe, the type of polishing pad, the type of polishing liquid (slurry), and the like. Among multiple polishing conditions, in some cases a change (characteristic point) in a torque current is not significantly manifested even when a change arises in the driving load of a driving portion. In a case where a change in the torque current is small, there is a risk that it will not be possible to appropriately detect the endpoint of polishing due to the influence of noise or waviness that arises in the waveform, and consequently a problem such as excessive polishing can arise.

Therefore, an object of a form of the present invention is to favorably detect the change in the torque current without changing the existing polishing recipe and to improve the accuracy of the polishing end point detection.

Further, an object of a form of the present invention is to favorably detect a change in a torque current and improve the accuracy of polishing endpoint detection even in a case where a change in the torque current is small.

Solution to Problem

In view of the problems, a form of an end point detection method of the present invention is an end point detection method based on a drive current supplied to a drive unit that rotates and drives one of a polishing table that holds a polishing pad and a holding unit that holds a polishing target and presses the polishing target against a polishing pad, the end point detection method including: a first determination step of determining whether a polishing condition of a polishing process to be executed coincides with a preset specific polishing condition; an adjustment step of adjusting a current control parameter in a drive control unit that controls the drive current, the current control parameter related to a change in the drive current with respect to a change in a driving load of the drive unit, if it is determined in the first determination step that the polishing condition coincides with the specific polishing condition; a detection step of detecting the drive current supplied to the drive unit based on the current control parameter adjusted in the adjustment step; and an end point detection step of detecting an end point of polishing based on the drive current detected in the detection step.

A form of the end point detection method can further include a second determination step of determining whether to add the polishing condition of the polishing process in execution to the specific polishing condition based on the drive current detected in the detection step during the execution of the polishing process.

In a form of the end point detection method, the polishing condition of the polishing process in execution can be added to the specific polishing condition in the second determination step if a change in the drive current detected in the detection step is smaller than a threshold value when the driving load of the drive unit is changed.

In a form of the end point detection method, in the end point detection step, the end point of polishing can be detected based on a change in the drive current detected in the detection step, and the polishing condition of the polishing process in execution can be added to the specific polishing condition in the second determination step if the end point of polishing is not detected in the end point detection step.

In a form of the end point detection method, the current control parameter can be adjusted in the adjustment step such that the change in the drive current becomes large with respect to the change in the driving load of the drive unit.

In a form of the end point detection method, when the drive control unit controls the drive current based on a deviation between an actual rotational speed of one of the polishing table and the holding unit and a target rotational speed, a control gain in the control based on the deviation can be increased in the adjustment step.

In a form of the end point detection method, when the polishing process includes a plurality of stages, the current control parameter can be adjusted in part of the plurality of stages in the adjustment step.

In a form of the end point detection method, the polishing condition may include at least one of a type of a polishing target, a type of a polishing recipe, a type of a polishing pad, and a type of a polishing liquid.

A form of a polishing apparatus of the present invention includes: a drive unit that rotates and drives one of a polishing table that holds a polishing pad and a holding unit that holds a polishing target and presses the polishing target against the polishing pad; a drive control unit that controls a drive current supplied to the drive unit; and an adjustment unit that adjusts a current control parameter in the drive control unit, the current control parameter related to a change in the drive current with respect to a change in a driving load of the drive unit, if a polishing condition of a polishing process to be executed coincides with a preset specific polishing condition.

A form of a polishing apparatus can further include a determination unit that determines whether the polishing condition of the polishing process to be executed coincides with the preset specific polishing condition, wherein the adjustment unit can adjust the current control parameter in the drive control unit if the determination unit determines that the polishing condition of the polishing process coincides with the specific polishing condition.

A form of the polishing apparatus can further include a current detection unit that detects the drive current supplied from the drive control unit to the drive unit during execution of the polishing process, wherein the determination unit can determine whether to add the polishing condition of the polishing process in execution to the specific polishing condition based on the drive current detected by the current detection unit.

In a form of the polishing apparatus, the determination unit can add the polishing condition of the polishing process in execution to the specific polishing condition if a change in the drive current detected by the current detection unit is smaller than a threshold value when the driving load of the drive unit is changed.

A form of the polishing apparatus can further include an end point detection unit that detects an end point of polishing based on a change in the drive current detected by the current detection unit, wherein the determination unit can add the polishing condition of the polishing process in execution to the specific polishing condition if the end point detection unit does not detect the end point of polishing.

In a form of the polishing apparatus, the adjustment unit can adjust the current control parameter such that the change in the drive current becomes large with respect to the change in the driving load of the drive unit.

In a form of the polishing apparatus, the drive control unit can control the drive current based on a deviation between an actual rotational speed of one of the polishing table and the holding unit and a target rotational speed, and the adjustment unit can increase a control gain in the control based on the deviation.

In a form of the polishing apparatus, when the polishing process includes a plurality of stages, the adjustment unit can adjust the current control parameter in part of the plurality of stages.

In a form of the polishing apparatus, the polishing condition may include at least one of a type of a polishing target, a type of a polishing recipe, a type of a polishing pad, and a type of a polishing liquid.

According to the present invention, a change in the torque current can be favorably detected without changing the existing polishing recipe, and the accuracy of the polishing end point detection can be improved.

Another first form of the polishing apparatus of the present invention provides a polishing apparatus that polishes a surface of a polishing target, the polishing apparatus including: a first electric motor that rotates and drives a polishing table that holds a polishing pad; and a second electric motor that rotates and drives a holding unit that holds the polishing target and presses the polishing target against the polishing pad, wherein at least one of the first and second electric motors includes a winding wire with a plurality of phases, and the polishing apparatus includes: a current detection unit that detects currents of at least two phases of the first and/or second electric motor; a rectification arithmetic unit that rectifies current detection values of the at least two phases detected by the current detection unit and that outputs a rectified signal after performing addition and/or multiplication for the rectified signal; and an end point detection unit that detects a polishing end point indicating an end of polishing of the surface of the polishing target based on a change in the output of the rectification arithmetic unit.

According to this form, there are the following advantageous effects when drive currents of a plurality of phases are rectified and added. That is, the detected current value is smaller than in the present form when only the drive current of one phase is detected. According to the present form, the current value becomes large as a result of the rectification and the addition, and the detection accuracy is improved.

In a motor including a plurality of phases in one motor, such as an AC servomotor, the rotational speed of the motor is managed without individually managing the currents of the phases, and the current values vary between the phases in some cases. Therefore, conventionally, there is a possibility of detecting a current value of a phase with the current value smaller than the other phases, and there is a possibility that a phase with a large current value cannot be used. According to the present form, the drive currents of a plurality of phases are added, and a phase with a large current value can be used. Therefore, the detection accuracy is improved.

Since the drive currents of a plurality of phases are rectified and added, the ripple is smaller than when only the drive current of one phase is used. Therefore, the detected alternating current is used for the determination of the end point, and the ripple of the direct current obtained by effective value conversion for conversion into direct current is also small. This improves the end point detection accuracy.

The added currents may be the current of at least one phase of the first electric motor and the current of at least one phase of the second electric motor. As a result, the signal value can be greater than when only the current value of one of the motors is used.

When the drive currents of a plurality of phases are rectified, and multiplication is performed for the obtained signal, there is an advantageous effect that a range of the values obtained by the multiplication can be brought into line with an input range of a processing circuit of a subsequent stage. There is also an advantageous effect that only a signal of a specific phase (for example, a phase with less noise than the other phases) can be increased or decreased (for example, when the noise is larger than the other phases).

Both the addition and the multiplication can also be performed. In this case, both the advantageous effects of the addition and the advantageous effects of the multiplication can be obtained. The numerical value (multiplier) for the multiplication may be changed in each phase. When, for example, the result of the addition exceeds the input range of the processing circuit of the subsequent stage, the multiplier is smaller than 1.

Note that although the rectification can be either half-wave rectification or full-wave rectification, the full-wave rectification is more preferable than the half-wave rectification, because the amplitude becomes large, and the ripple is reduced.

Another second form of the present invention provides the polishing apparatus according to the first form, wherein the end point detection unit includes at least one of: an amplification unit that amplifies the output of the rectification arithmetic unit; a noise removal unit that removes noise included in the output of the rectification arithmetic unit; and a subtraction unit that subtracts a prescribed amount from the output of the rectification arithmetic unit.

The amplification can increase the change in the torque current. The removal of noise can make apparent the change in the current buried in the noise.

The subtraction unit attains the following advantageous effect. The detected current usually includes a current part that changes along with a change in the friction force and a part with a constant amount of current (bias) that does not change along with the change in the friction force. The bias can be removed to extract only the current part that depends on the change in the friction force, and the current can be amplified to the maximum amplitude within a range that allows signal processing. The accuracy of the end point detection method of detecting the end point based on the change in the friction force is improved.

Note that when two or more of the amplification unit, the subtraction unit, and the noise removal unit are included, the units are cascaded. For example, when the amplification unit and the noise removal unit are included, the amplification unit first executes the process. Then, the processing result is transmitted to the noise removal unit, and the noise removal unit executes the process. Alternatively, the noise removal unit first executes the process, and the processing result is transmitted to the amplification unit to execute the process.

Another third form of the present invention provides the polishing apparatus according to the second form, wherein the end point detection unit includes the amplification unit, the subtraction unit, and the noise removal unit, the subtraction unit performs the subtraction for a signal amplified by the amplification unit, and the noise removal unit removes the noise from the signal subjected to the subtraction. According to this form, the subtraction and the noise removal are performed for a signal with a large amplitude after the amplification, and the subtraction and the noise removal can be accurately performed. As a result, the end point detection accuracy is improved.

Note that although it is preferable to perform the amplification, the subtraction, and the noise removal in this order, they may not be performed in this order. For example, they can be performed in the order of the noise removal, the subtraction, and the amplification.

Another fourth form of the present invention provides the polishing apparatus according to the third form, wherein the end point detection unit includes a second amplification unit that further amplifies the signal from which the noise is removed by the noise removal unit. According to this, the size of the current reduced by the noise removal can be restored, and the accuracy of the end point detection method is improved.

Another fifth aspect of the present invention provides the polishing apparatus according to the second form, wherein the end point detection unit includes the amplification unit and a control unit that controls amplification characteristics of the amplification unit. According to this form, optimal amplification characteristics (such as an amplification factor and frequency characteristics) can be selected according to the material, the structure, and the like of the polishing target.

Another sixth form of the present invention provides the polishing apparatus according to the second form, wherein the end point detection unit includes the noise removal unit and a control unit that controls noise removal characteristics of the noise removal unit. According to this form, optimal noise removal characteristics (such as a passband of signal and an amount of attenuation) can be selected according to the material, the structure, and the like of the polishing target.

Another seventh form of the present invention provides the polishing apparatus according to the second form, wherein the end point detection unit includes the subtraction unit and a control unit that controls subtraction characteristics of the subtraction unit. According to this form, optimal subtraction characteristics (such as a subtraction amount and frequency characteristics) can be selected according to the material, the structure, and the like of the polishing target.

Another eighth form of the present invention provides the polishing apparatus according to the fourth form, wherein the end point detection unit includes a control unit that controls amplification characteristics of the second amplification unit. According to this form, optimal second amplification characteristics (such as an amplification factor and frequency characteristics) can be selected according to the material, the structure, and the like of the polishing target.

Another ninth form of the polishing apparatus of the present invention provides a polishing method. The polishing method is a polishing method of polishing a surface of a polishing target by using a polishing apparatus, the polishing apparatus including: a first electric motor that rotates and drives a polishing table that holds a polishing pad; and a second electric motor that rotates and drives a holding unit that holds the polishing target and presses the polishing target against the polishing pad, wherein at least one of the first and second electric motors includes a winding wire with a plurality of phases. The method includes: a current detection step of detecting currents of at least two phases of the first and/or second electric motor; a rectification arithmetic step of rectifying current detection values of the at least two detected phases and outputting a rectified signal after performing addition and/or multiplication for the rectified signal; and an end point detection step of detecting a polishing end point indicating an end of polishing of the surface of the polishing target based on a change in the output in the rectification arithmetic step. According to this form, the same advantageous effects as the first form can be attained.

Another tenth form of the present invention provides the polishing method according to the ninth form, wherein the end point detection step includes at least one of: an amplification step of amplifying the output in the rectification arithmetic step; a noise removal step of removing noise included in the output in the rectification arithmetic step; and a subtraction step of subtracting a prescribed amount from the output in the rectification arithmetic step. According to this form, the same advantageous effects as the second form can be attained.

Another eleventh form of the polishing apparatus of the present invention provides the polishing method according to the ninth form, wherein in the end point detection step, the subtraction of the prescribed amount is performed in the subtraction step for a signal amplified in the amplification step, and the noise is removed in the noise removal step from the signal subjected to the subtraction. According to this form, the same advantageous effect as the third form can be attained.

Another twelfth form of the polishing apparatus of the present invention provides the polishing method according to the eleventh form, wherein the end point detection step further includes a second amplification step of further amplifying the signal from which the noise is removed in the noise removal step. According to this form, the same advantageous effects as the fourth form can be attained.

BRIEF DESCRIPTION OF DRAWINGS

FIG. 15 is a multiple view drawing in which FIG. 15(a) is a graph illustrating an output 56a of an effective value converter 56 of the comparative example, and FIG. 15(b) is a graph illustrating an output 48a of an effective value converter 48 of the present embodiment.

DESCRIPTION OF EMBODIMENTS

A polishing apparatus according to one embodiment of the present invention is described hereunder based on the accompanying drawings. First, the basic configuration of the polishing apparatus will be described, and thereafter detection of a polishing endpoint of a polishing target will be described.

<Basic Configuration>

Figure 1:
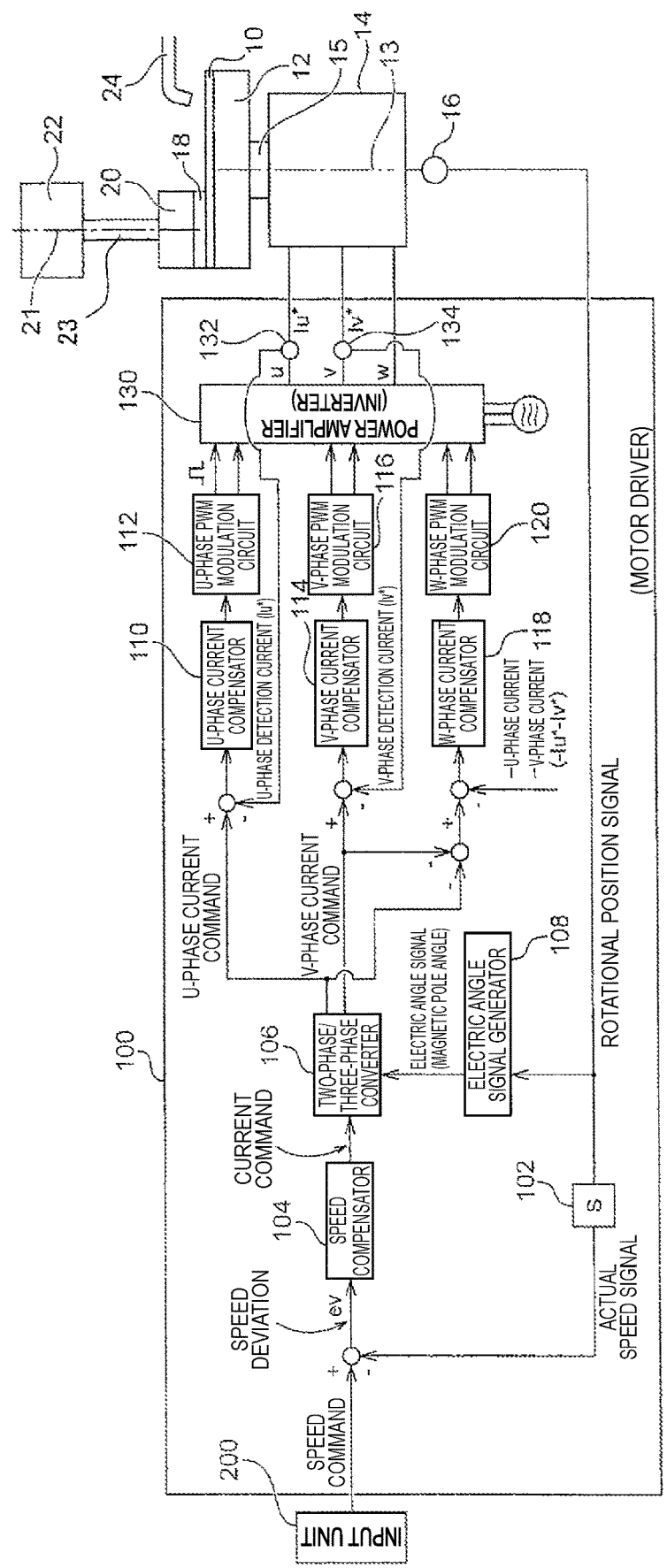
FIG. 1 is a view illustrating a basic configuration of a polishing apparatus according to the present embodiments.

FIG. 1 is a view illustrating the basic configuration of the polishing apparatus according to the present embodiment. The polishing apparatus includes: a polishing table 12 that can attach a polishing pad 10 to an upper surface; a first electric motor (first drive unit) 14 that rotates and drives the polishing table 12; a position detection sensor 16 that detects a rotational position of the first electric motor; a top ring (holding unit) 20 that can hold a semiconductor wafer 18; and a second electric motor (second drive unit) 22 that rotates and drives the top ring 20.

A holding apparatus not illustrated can move the top ring 20 close to or away from the polishing table 12. When the semiconductor wafer 18 is polished, the top ring 20 is moved close to the polishing table 12 to bring the semiconductor wafer 18 held by the top ring 20 into contact with the polishing pad 10 attached to the polishing table 12.

When the semiconductor wafer 18 is polished, the semiconductor wafer 18 held by the top ring 20 is pressed against the polishing pad 10 in the state that the polishing table 12 is rotated and driven. The second electric motor 22 rotates and drives the top ring 20 about an axis 21 eccentric from a rotational axis 13 of the polishing table 12. When the semiconductor wafer 18 is polished, a polishing liquid including a polishing agent is supplied from a polishing agent supply apparatus 24 to an upper surface of the polishing pad 10. The semiconductor wafer 18 set on the top ring 20 is pressed against the polishing pad 10 supplied with the polishing liquid in the state that the top ring 20 is rotated and driven by the second electric motor 22.

The first electric motor 14 is preferably a synchronous or inductive AC servomotor including a winding wire with at least three phases, that is, a U phase, a V phase, and a W phase. The first electric motor 14 includes an AC servomotor provided with a three-phase winding wire in the present embodiment. The three-phase winding wire applies currents with phases shifted by 120 degrees to field winding provided around a rotor in the first electric motor 14, and as a result, the rotor is rotated and driven. The rotor of the first electric motor 14 is connected to a motor shaft 15, and the motor shaft 15 rotates and drives the polishing table 12.

The second electric motor 22 is preferably a synchronous or inductive AC servomotor including a winding wire with at least three phases, that is, a U phase, a V phase, and a W phase. The second electric motor 22 includes an AC servomotor provided with a three-phase winding wire in the present embodiment. The three-phase winding wire applies currents with phases shifted by 120 degrees to field winding provided around a rotor in the second electric motor 22, and as a result, the rotor is rotated and driven. The rotor of the second electric motor 22 is connected to a motor shaft 23, and the motor shaft 23 rotates and drives the top ring 20.

Figure 4:
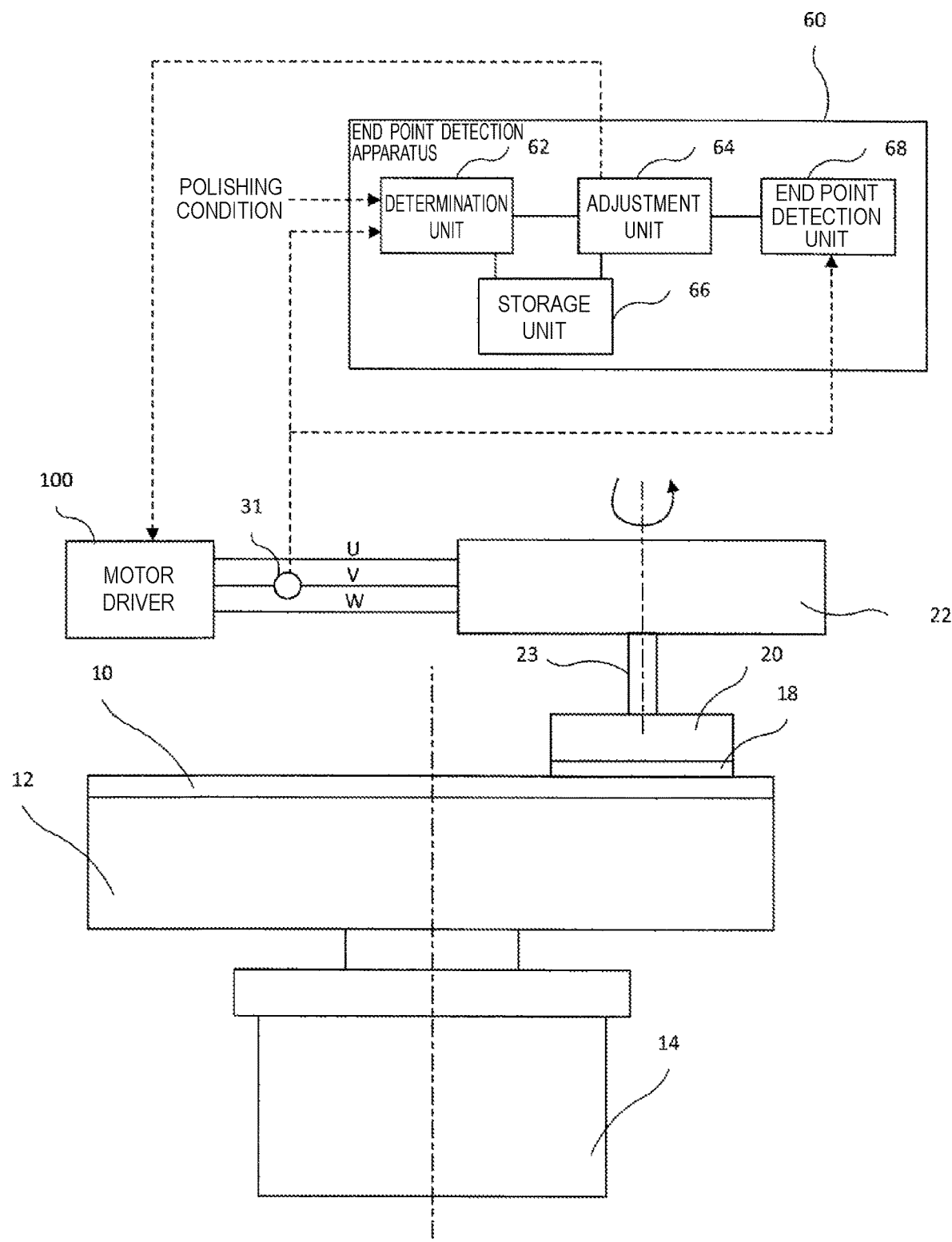
FIG. 4 is a view schematically illustrating a configuration related to drive current adjustment of the polishing apparatus of a second embodiment.

The polishing apparatus further includes: a motor driver 100 that rotates and drives the first electric motor 14; and an input unit 200 that receives a command signal of rotational speed of the first electric motor 14 from an operator through an input interface such as a keyboard and a touch panel. The input unit 200 inputs the received command signal to the motor driver 100. Note that although the motor driver 100 that rotates and drives the first electric motor 14 is described in FIG. 1, the motor driver 100 is similarly connected to the second electric motor 22 as illustrated in FIG. 4.

The motor driver 100 includes a differentiator 102, a speed compensator 104, a two-phase/three-phase converter 106, an electric angle signal generator 108, a U-phase current compensator 110, a U-phase PWM modulation circuit 112, a V-phase current compensator 114, a V-phase PWM modulation circuit 116, a W-phase current compensator 118, a W-phase PWM modulation circuit 120, a power amplifier 130, and current sensors 132 and 134.

The differentiator 102 differentiates a rotational position signal detected by the position detection sensor 16 to generate an actual speed signal equivalent to the actual rotational speed of the first electric motor 14. That is, the differentiator 102 is an arithmetic device that determines the rotational speed of the first electric motor 14 based on the detection value of the rotational position of the first electric motor 14.

The speed compensator 104 compensates the rotational speed of the first electric motor 14 based on a speed deviation signal equivalent to a deviation between the command signal (target value) of the rotational speed input through the input unit 200 and the actual speed signal generated by the differentiator 102. That is, the speed compensator 104 generates a command signal of the current supplied to the first electric motor 14 based on the deviation between the command value of the rotational speed of the first electric motor 14 input through the input interface (input unit 200) and the rotational speed of the first electric motor 14 determined by the differentiator 102.

The speed compensator 104 can be, for example, a PID controller. In this case, the speed compensator 104 performs proportional control, integral control, and differential control to generate a current command signal equivalent to the compensated rotational speed. In the proportional control, an amount of operation is changed in proportion to the deviation between the command signal of the rotational speed input from the input unit 200 and the actual speed signal of the first electric motor. In the integral control, the deviations are added, and the amount of operation is changed in proportion to the value. In the differential control, a change rate of the deviation (that is, speed of the change in the deviation) is obtained, and an amount of operation proportional to the change rate is output. Note that the speed compensator 104 can also be a PI controller.

The electric angle signal generator 108 generates an electric angle signal based on the rotational position signal detected by the position detection sensor 16. The two-phase/three-phase converter 106 generates a U-phase current command signal and a V-phase current command signal based on the current command signal generated by the speed compensator 104 and the electric angle signal generated by the electric angle signal generator 108. That is, the two-phase/three-phase converter 106 is a converter that generates the current command values of at least two of the phases based on the electric angle signal generated based on the detection value of the rotational position of the first electric motor 14 and the command signal of the current generated by the speed compensator 104.

Figure 2:
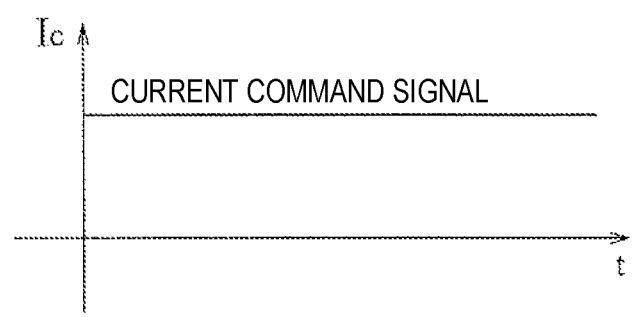
FIG. 2 is a view for describing content of processing by a two-phase/three-phase converter.
Figure 2:
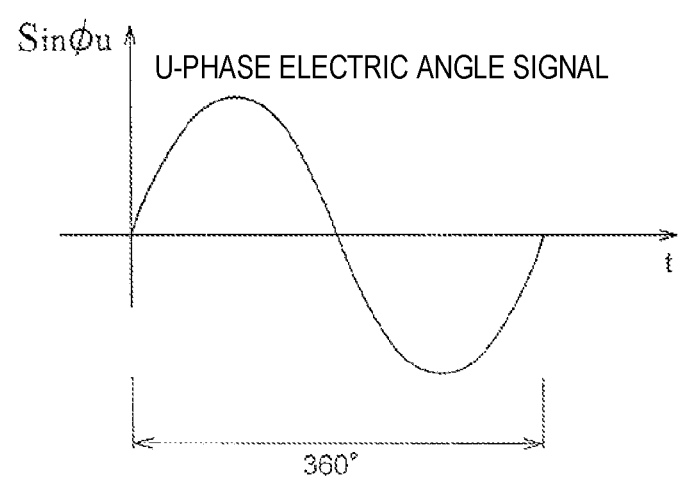

Here, the process by the two-phase/three-phase converter 106 will be described in detail. FIG. 2 is a view for describing content of processing by the two-phase/three-phase converter. A current command signal Ic as illustrated in FIG. 2 is input to the two-phase/three-phase converter 106 from the speed compensator 104. A U-phase electric angle signal Sin φu as illustrated in FIG. 2 is input to the two-phase/three-phase converter 106 from the electric angle signal generator 108. Note that although not illustrated in FIG. 2, a V-phase electric angle signal Sin φv is also input to the two-phase/three-phase converter 106.

For example, a case of generating a U-phase current command signal Iuc will be considered. In this case, the two-phase/three-phase converter 106 multiplies a current command signal Ic(i) by a U-phase electric angle signal Sin φu(i) at a certain time ti to generate a U-phase current command signal Iuc(i). That is, the formula is Iuc(i)=Ic(i)×Sin φu(i). The two-phase/three-phase converter 106 also multiplies a current command signal Ic(i) by a V-phase electric angle signal Sin φv(i) at the certain time ti as in the case of the U phase to generate a V-phase current command signal Ivc(i). That is, the formula is Ivc(i)=Ic(i)×Sin φv(i).

The current sensor 132 is provided on a U-phase output line of the power amplifier 130 and detects a U-phase current output from the power amplifier 130. The U-phase current compensator 110 compensates the U-phase current based on a U-phase current deviation signal equivalent to a deviation between the U-phase current command signal Iuc output from the two-phase/three-phase converter 106 and a U-phase detection current Iu* detected and fed back by the current sensor 132. The U-phase current compensator 110 can be, for example, a PI controller or a PID controller. The U-phase current compensator 110 uses PI control or PID control to compensate the U-phase current and generates a U-phase current signal equivalent to the compensated current.

The U-phase PWM modulation circuit 112 modulates the pulse width based on the U-phase current signal generated by the U-phase current compensator 110. The U-phase PWM modulation circuit 112 modulates the pulse width to generate a dual pulse signal according to the U-phase current signal.

The current sensor 134 is provided on a V-phase output line of the power amplifier 130 and detects a V-phase current output from the power amplifier 130. The V-phase current compensator 114 compensates the V-phase current based on a V-phase current deviation signal equivalent to a deviation between the V-phase current command signal Ivc output from the two-phase/three-phase converter 106 and a V-phase detection current Iv* detected and fed back by the current sensor 134. The V-phase current compensator 114 can be, for example, a PI controller or a PID controller. The V-phase current compensator 114 uses PI control or PID control to compensate the V-phase current and generates a V-phase current signal equivalent to the compensated current.

The V-phase PWM modulation circuit 116 modulates the pulse width based on the V-phase current signal generated by the V-phase current compensator 114. The V-phase PWM modulation circuit 114 modulates the pulse width to generate a dual pulse signal according to the V-phase current signal.

The W-phase current compensator 118 compensates the W-phase current based on a W-phase current deviation signal equivalent to a deviation between a W-phase current command signal Iwc generated based on the U-phase current command signal Iuc and the V-phase current command signal Ivc output from the two-phase/three-phase converter 106 and the U-phase detection current Iu* and the V-phase detection current Iv* detected and fed back by the current sensors 132 and 134. The W-phase current compensator 118 can be, for example, a PI controller or a PID controller. The W-phase current compensator 118 uses PI control or PID control to compensate the W-phase current and generates a W-phase current signal equivalent to the compensated current.

The W-phase PWM modulation circuit 120 modulates the pulse width based on the W-phase current signal generated by the W-phase current compensator 118. The W-phase PWM modulation circuit 118 modulates the pulse width to generate a dual pulse signal according to the W-phase current signal.

The dual pulse signals generated by the U-phase PWM modulation circuit 112, the V-phase PWM modulation circuit 116, and the W-phase PWM modulation circuit 120 are applied to the power amplifier 130. The power amplifier 130 drives each transistor of an inverter built in the power amplifier 130 according to each of the applied pulse signals. As a result, the power amplifier 130 outputs AC power for each of the U phase, the V phase, and the W phase and rotates and drives the first electric motor 14 based on the three-phase AC power.

<Drive Current Adjustment>

Figure 3:
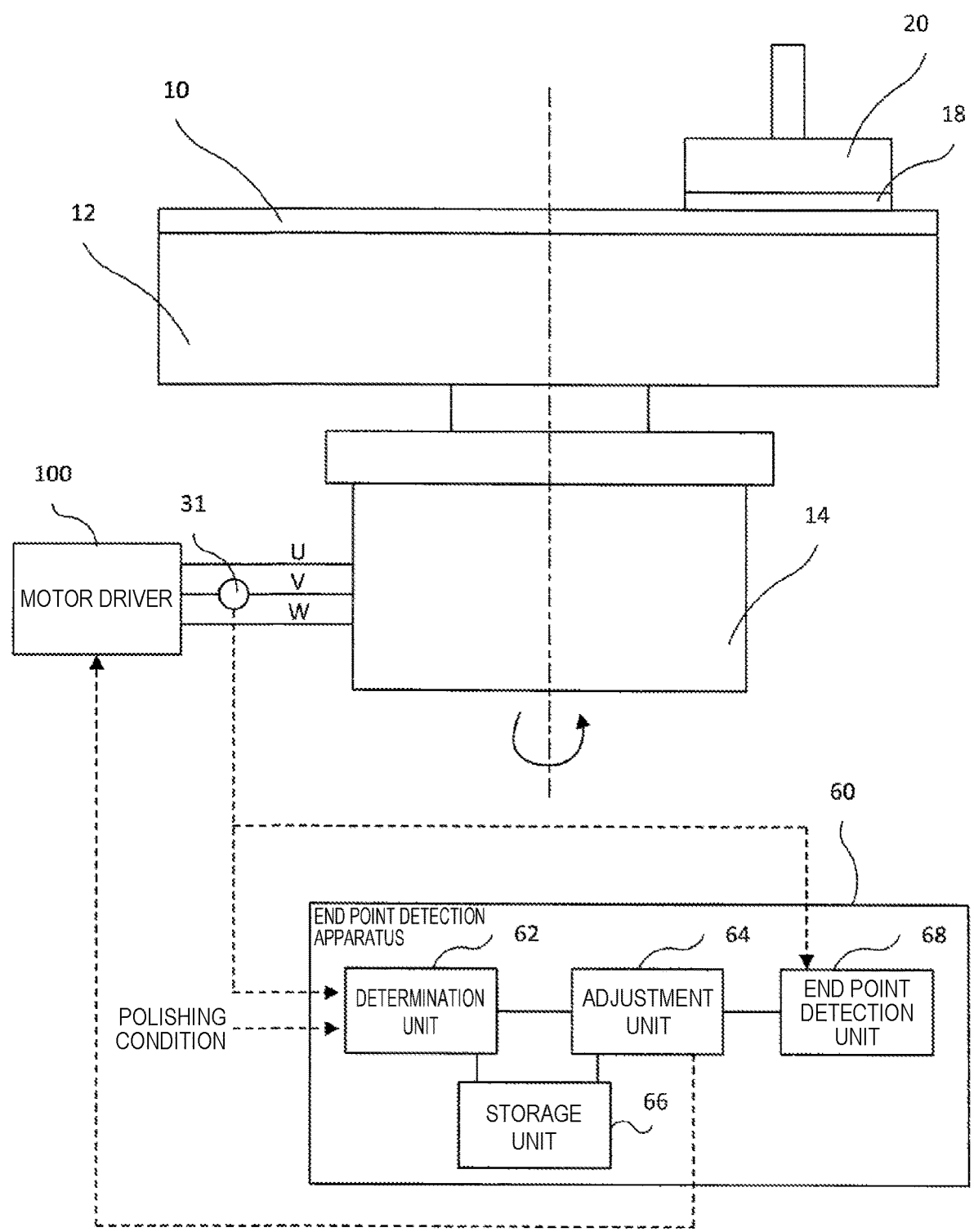
FIG. 3 is a view schematically illustrating a configuration related to drive current adjustment of the polishing apparatus of a first embodiment.

Next, adjustment of the drive current in the motor driver 100 will be described. FIG. 3 is a view schematically illustrating a configuration related to drive current adjustment of the polishing apparatus of a first embodiment. FIG. 4 is a view schematically illustrating a configuration related to drive current adjustment of the polishing apparatus of a second embodiment. Note that the difference is that while the first embodiment is an embodiment for adjusting the drive current in the motor driver 100 that drives the first electric motor 14, the second embodiment is an embodiment that adjusts the drive current in the motor driver 100 that drives the second electric motor 22. The same parts in the first embodiment and the second embodiment will be described altogether.

As illustrated in FIGS. 3 and 4, the polishing apparatus includes a second current sensor (current detection unit) 31 on one of the U phase, the V phase, and the W phase (V phase in the first and second embodiments). The second current sensor 31 is provided on a current path of the V phase between the motor driver 100 and the first electric motor 14 or on a current path of the V phase between the motor driver 100 and the second electric motor 22. The second current sensor 31 detects the current of the V phase and outputs the current to an end point detection apparatus 60.

The end point detection apparatus 60 detects a polishing end point of the semiconductor wafer 18. The end point detection apparatus 60 and the motor driver 100 can transmit and receive commands through, for example, serial communication. The end point detection apparatus 60 includes a determination unit 62, an adjustment unit 64, a storage unit 66, and an end point detection unit 68.

The determination unit 62 determines whether a polishing condition of a polishing process to be executed coincides with a preset specific polishing condition. The polishing condition includes at least one of the type of the polishing target, the type of the polishing recipe, the type of the polishing pad, and the type of the polishing liquid (slurry), for example.

The polishing condition of the polishing process to be executed is input to the determination unit 62 through, for example, the input unit 200 of the polishing apparatus. The determination unit 62 reads the specific polishing condition stored in the storage unit 66 and compares the read specific polishing condition and the input polishing condition to determine whether the input polishing condition coincides with the specific polishing condition. Note that other than the input of the polishing condition through the input unit 200, a reader or the like can read information indicating the content of the polishing condition stored in a tag attached to the semiconductor wafer 18 to input the polishing condition to the determination unit 62, for example.

A drive current detected by the second current sensor 31 during the execution of the polishing process is also input to the determination unit 62. The determination unit 62 determines whether to add the polishing condition of the polishing process in execution to the specific polishing condition based on the drive current detected by the second current sensor 31. More specifically, the determination unit 62 stores, in the storage unit 66, the information indicating the content of the polishing condition of the polishing process in execution to add the polishing condition to the specific polishing condition if a change in the drive current detected by the second current sensor 31 is smaller than a threshold value when a driving load of the first electric motor 14 or the second electric motor 22 is changed.

The determination unit 62 also stores, in the storage unit 66, the information indicating the content of the polishing condition of the polishing process in execution to add the polishing condition to the specific polishing condition when the end point of polishing is not detected by the end point detection unit 68.

The adjustment unit 64 adjusts (changes) a current control parameter related to the change in the drive current with respect to the change in the driving load of the first electric motor 14 or the second electric motor 22 in the motor driver 100 when the determination unit 62 determines that the polishing condition of the polishing process to be executed coincides with the specific polishing condition.

Specifically, the adjustment unit 64 adjusts the current control parameter such that the change in the drive current becomes large with respect to the change in the driving load of the first electric motor 14 or the second electric motor 22. More specifically, the current control parameter is a control gain of the feedback control in the speed compensator 104 of the motor driver 100. The speed compensator 104 controls the drive current based on the deviation between the actual rotational speed and the target rotational speed of the polishing table 12 or the top ring 20 as described above. The adjustment unit 64 transmits, to the motor driver 100, a command for increasing the control gain in the control based on the deviation when the determination unit 62 determines that the polishing condition of the polishing process to be executed coincides with the specific polishing condition.

The sensitivity of the feedback control is increased by increasing the control gain, and the change in the drive current becomes large when the driving load of the first electric motor 14 or the second electric motor 22 is changed.

Figure 5:
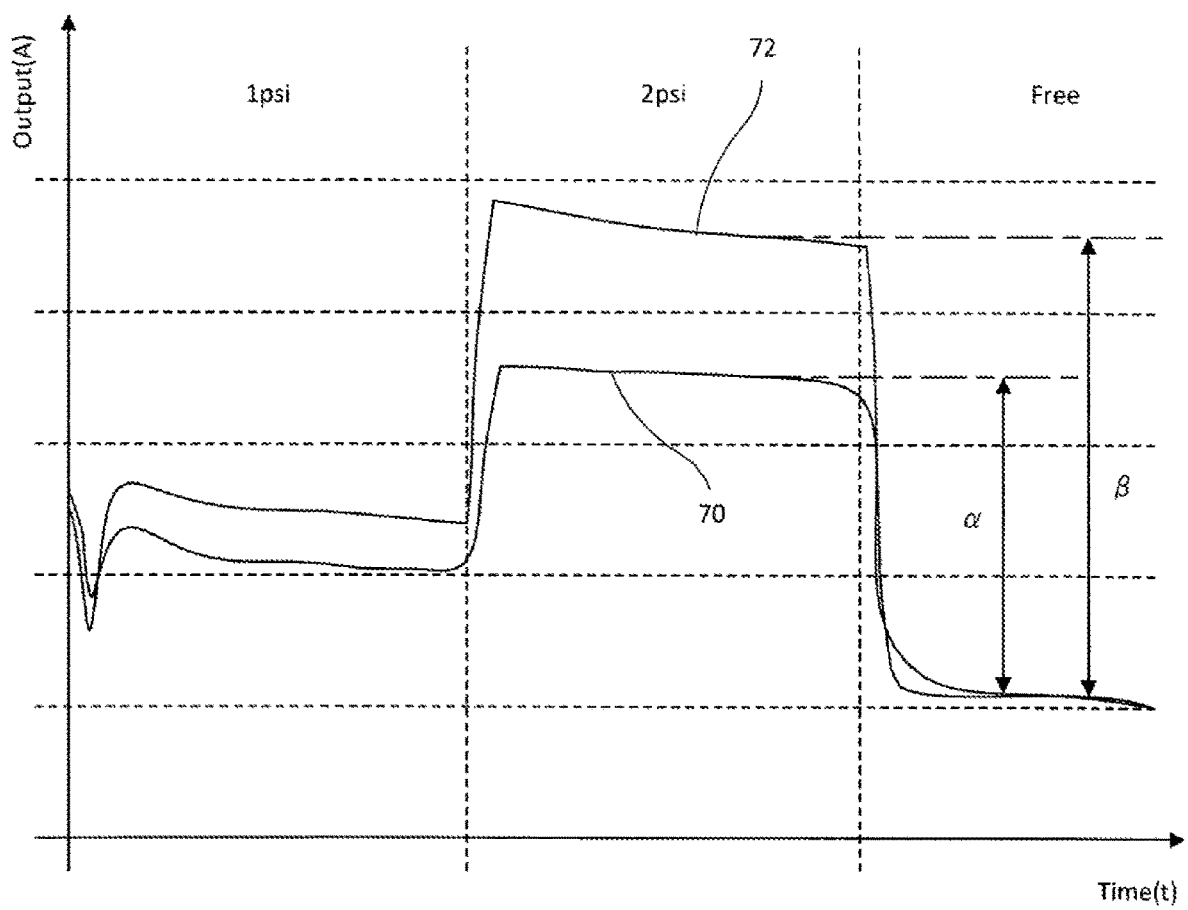
FIG. 5 is a view schematically illustrating changes in drive currents according to the first and second embodiments.
Figure 6:
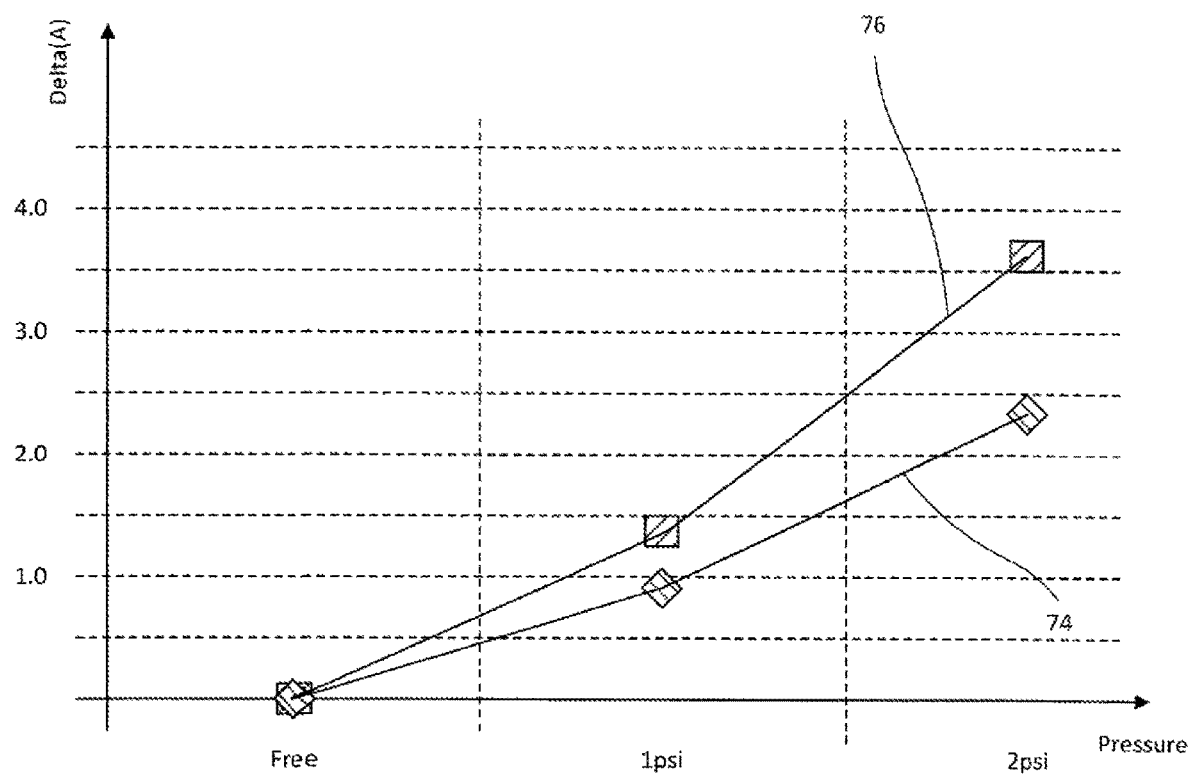
FIG. 6 is a view schematically illustrating changes in the drive currents according to the first and second embodiments.

This will be described in detail. FIGS. 5 and 6 are views schematically illustrating the change in the drive current according to the first and second embodiments. FIG. 5 illustrates drive currents before and after the adjustment of the current control parameter of the motor driver 100. The horizontal axis represents time (t), and the vertical axis represents drive current (A). FIG. 6 illustrates differences between the drive currents before and after the adjustment of the current control parameter of the motor driver 100. The horizontal axis represents time (t), and the vertical axis represents an amount of change (AA) in average values of the drive currents in a state that pressure is applied between the polishing pad 10 and the semiconductor wafer 18 based on average values of the differences (AA) between the drive currents (A) in a state that pressure is not applied between the polishing pad 10 and the semiconductor wafer 18.

FIG. 5 illustrates drive currents in a state (Free) that pressure is not applied between the polishing pad 10 and the semiconductor wafer 18, in a state that pressure of 1 psi is applied, and in a state that pressure of 2 psi is applied. The pressure between the polishing pad 10 and the semiconductor wafer 18 is correlated to the driving load of the first electric motor 14 or the second electric motor 22. As illustrated in FIG. 5, when the pressure applied between the polishing pad 10 and the semiconductor wafer 18 changes, a waveform 72 of the drive current after the adjustment of the current control parameter changes more than a waveform 70 of the drive current before the adjustment of the current control parameter. For example, α is greater than β, wherein α represents an amount of change in the waveform 70 when the pressure is changed from 2 psi to Free, and β represents an amount of change in the waveform 72 when the pressure is changed from 2 psi to Free.

For example, as illustrated in FIG. 6, comparing an amount of change 74 in the drive current before the adjustment of the current control parameter and an amount of change 76 in the drive current after the adjustment of the current control parameter when the pressure between the polishing pad 10 and the semiconductor wafer 18 is changed from Free to 1 psi, the difference between the changes in the drive currents is about 0.5 (A). Comparing the amount of change 74 in the drive current before the adjustment of the current control parameter and the amount of change 76 in the drive current after the adjustment of the current control parameter when the pressure between the polishing pad 10 and the semiconductor wafer 18 is changed from 1 psi to 2 psi, the difference between the changes in the drive currents is 1 (A) or greater.

As described, in the first and second embodiments, the current control parameter in the motor driver 100 is adjusted when it is determined that the polishing condition of the polishing process coincides with the specific polishing condition. In this way, the change in the drive current when the driving load of the first electric motor 14 or the second electric motor 22 is changed can be large. As a result, according to the first and second embodiments, the change in the torque current can be favorably detected without changing the existing polishing recipe, and the accuracy of the polishing end point detection is improved. Therefore, the end point detection unit 68 can appropriately detect the end point based on the change in the drive current.

Note that although the control gain of the feedback control in the speed compensator 104 of the motor driver 100 is described as an example of the current control parameter, the current control parameter is not limited to this. For example, a current control parameter of the motor driver 100 related to the moment of inertia of the first electric motor 14 or the second electric motor 22 may be adjusted. More specifically, the current control parameter of the motor driver 100 can be adjusted to reduce the moment of inertia of the first electric motor 14 or the second electric motor 22 when it is determined that the polishing condition of the polishing process coincides with the specific polishing condition. According to this, the moment of inertia of the first electric motor 14 or the second electric motor 22 becomes small, and the change in the drive current when the driving load of the first electric motor 14 or the second electric motor 22 is changed becomes large. As a result, the end point detection unit 68 can appropriately detect the end point based on the change in the drive current.

In addition, when the polishing process includes a plurality of stages, the adjustment unit 64 can adjust the current control parameter in part of the plurality of stages. For example, a case will be considered in which the polishing process includes a first stage of polishing the semiconductor wafer 18 at a first polishing rate and a second stage of polishing the semiconductor wafer 18 at a second polishing rate smaller than the first polishing rate after the first stage. In the polishing process, to reduce the entire polishing time, the semiconductor wafer 18 is polished at a large polishing rate in the first stage, and the process shifts to the second stage after a prescribed time. The semiconductor wafer 18 is polished at a small polishing rate in the second stage, and the end point is detected. In such a case, the adjustment unit 64 adjusts the current control parameter (for example, control gain) of the motor driver 100 in the second stage.

<Polishing End Point Detection>

The end point detection unit 68 detects the polishing end point of the semiconductor wafer 18 based on the drive current (torque current) detected by the second current sensor 31. More specifically, the end point detection unit 68 determines the end point of polishing of the semiconductor wafer 18 based on the change in the drive current detected by the second current sensor 31.

Figure 7:
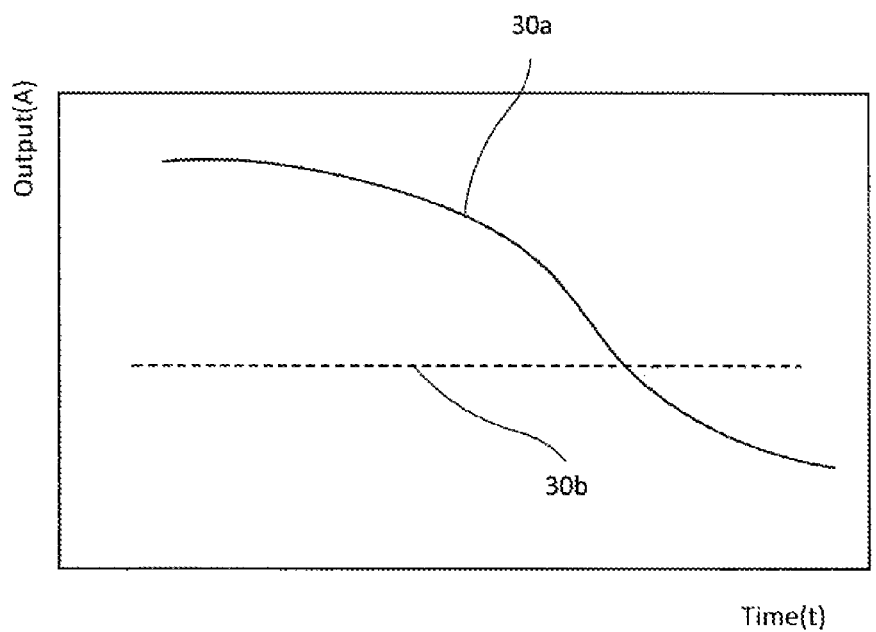
FIG. 7 is a view illustrating an example of a detection mode of an end point of polishing.
Figure 7:
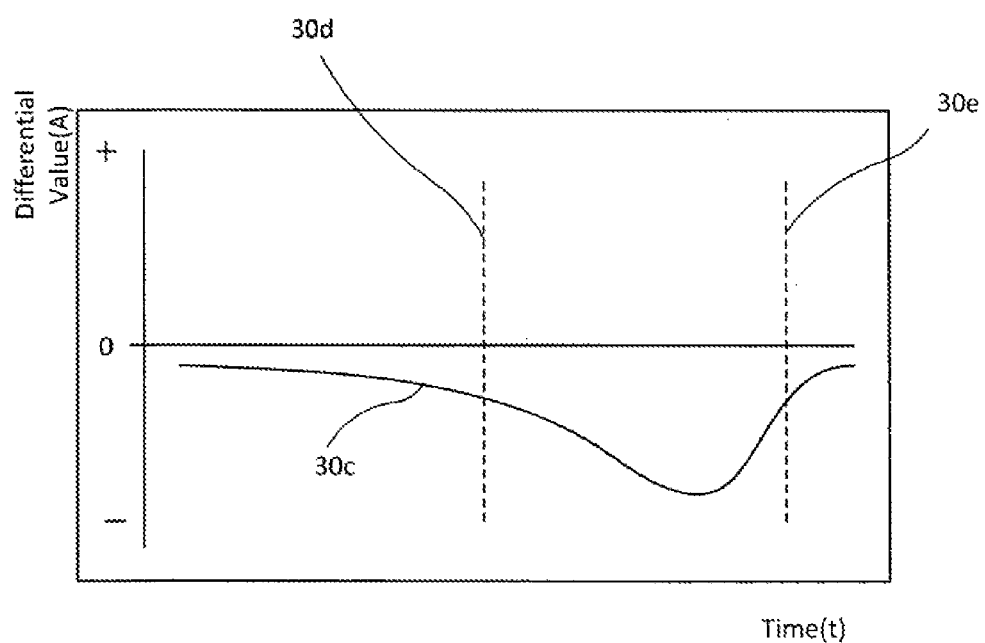

The determination of the polishing end point of the end point detection unit 68 will be described with reference to FIG. 7. FIG. 7 is a view illustrating an example of a detection mode of the end point of polishing. In FIG. 7, the horizontal axis represents a lapse of polishing time, and the vertical axis represents a drive current (I) and a differential value (ΔI/Δt) of the drive current.

When a drive current 30a (V-phase motor current) makes a transition as in FIG. 7, the end point detection unit 68 can determine that the polishing of the semiconductor wafer 18 has reached the end point once the drive current 30a becomes smaller than a threshold value 30b set in advance.

The end point detection unit 68 can also determine a differential value 30c of the drive current 30a as in FIG. 7 and determine that the polishing of the semiconductor wafer 18 has reached the end point when the end point detection unit 68 detects that the gradient of the differential value 30c shifts from negative to positive in a time period between time threshold values 30d and 30e set in advance. That is, the time threshold values 30d and 30e are set to an approximate time period considered to be the polishing end point based on a rule of thumb or the like, and the end point detection unit 68 detects the end point of polishing in the time period between the time threshold values 30d and 30e. Therefore, the end point detection unit 68 does not determine that the polishing of the semiconductor wafer 18 has reached the end point in a time period other than the time period between the time threshold values 30d and 30e even if the gradient of the differential value 30c shifts from negative to positive. This is for preventing a false detection of the polishing end point when the gradient shifts from negative to positive after hunting of the differential value 30c due to instability of polishing, such as just after the start of polishing. The end point detection unit 68 can also determine that the polishing of the semiconductor wafer 18 has reached the end point when the amount of change in the drive current 30a is greater than a preset threshold value. Hereinafter, a specific example of the determination of the polishing end point by the end point detection unit 68 will be illustrated.

For example, a case will be considered in which the semiconductor wafer 18 is laminated by different materials, such as a semiconductor, a conductor, and an insulator. In this case, the coefficient of friction varies between the different material layers, and the motor torque of the first electric motor 14 or the second electric motor 22 changes when the polishing shifts to a different material layer. The V-phase motor current (detection current signal) also changes according to the change. The end point detection unit 68 detects that the motor current has become greater than or smaller than the threshold value to determine the end point of polishing of the semiconductor wafer 18. The end point detection unit 68 can also determine the end point of polishing of the semiconductor wafer 18 based on a change in the differential value of the motor current.

For example, a case will be considered in which a polishing surface of the semiconductor wafer 18 that is not flat is flattened by polishing. In this case, the motor torque of the first electric motor 14 or the second electric motor 22 changes when the polishing surface of the semiconductor wafer 18 is flattened. The V-phase motor current (detection current signal) also changes according to the change. The end point detection unit 68 detects that the motor current has become smaller than the threshold value to determine the end point of polishing of the semiconductor wafer 18. The end point detection unit 68 can also determine the end point of polishing of the semiconductor wafer 18 based on the change in the differential value of the motor current.

<Flowcharts>

Figure 8:
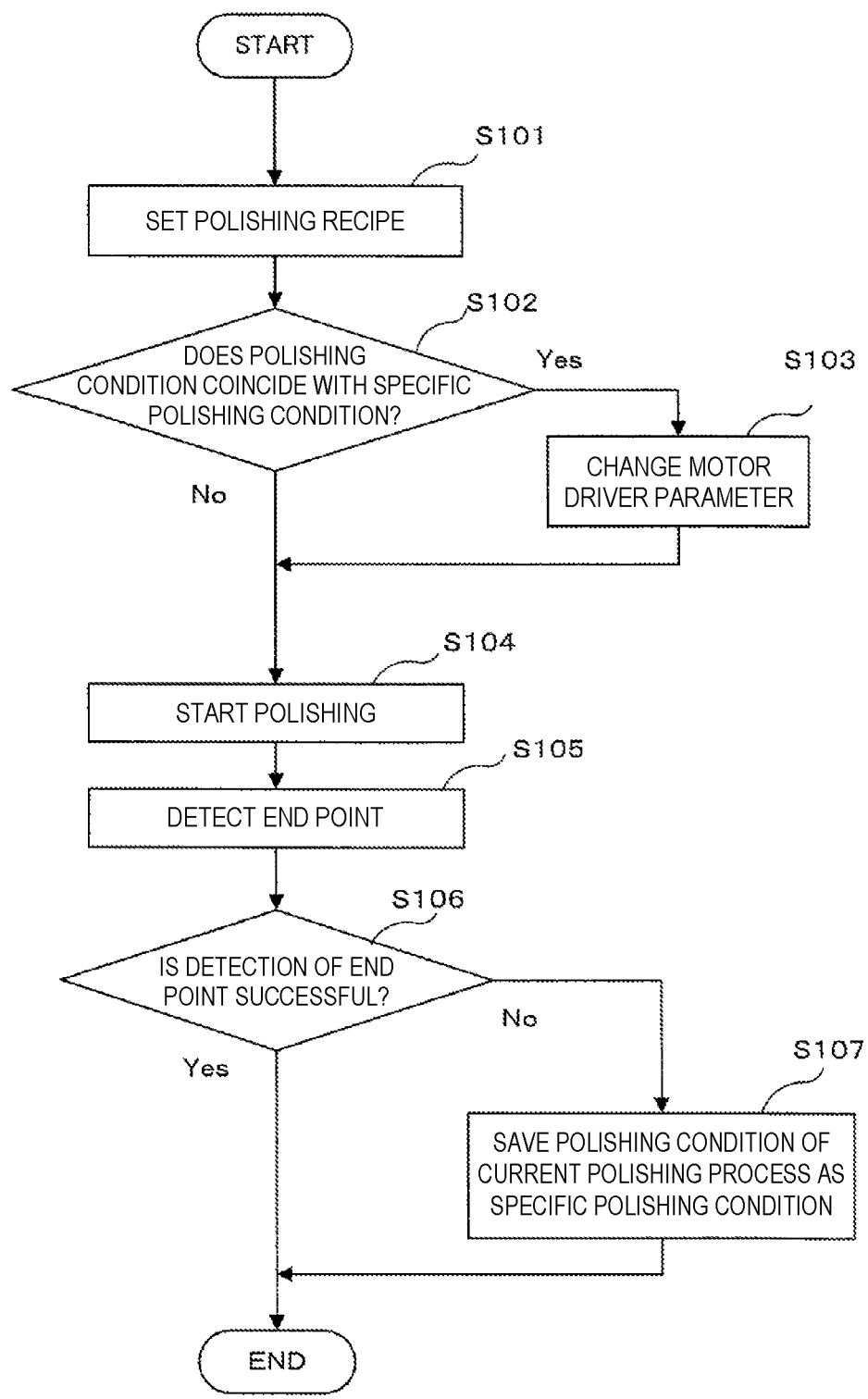
FIG. 8 is a flowchart of a current adjustment method by the polishing apparatus of the first and second embodiments.

Next, current adjustment methods by the polishing apparatus of the first and second embodiments will be described. FIG. 8 is a flowchart of the current adjustment method by the polishing apparatus of the first and second embodiments. FIG. 8 is a flowchart of the current adjustment method when the polishing process includes a single stage.

As illustrated in FIG. 8, a polishing recipe of the polishing process is first set in the current adjustment method (step S101). Subsequently, whether a polishing condition (for example, a combination of the type of the semiconductor wafer 18 and the type of the polishing recipe) of the polishing process to be executed coincides with a specific condition is determined in the current adjustment method (step S102). For example, the determination unit 62 can make the determination based on the specific polishing condition stored in the storage unit 66.

If it is determined that the polishing condition of the polishing process to be executed coincides with the specific polishing condition (step S102, Yes), the adjustment unit 64 adjusts the current control parameter of the motor driver 100 (step S103).

On the other hand, if it is determined that the polishing condition of the polishing process to be executed does not coincide with the specific polishing condition (step S102, No), the current control parameter of the motor driver 100 is not adjusted.

Subsequently, polishing of the semiconductor wafer 18 is started in the current adjustment method (step S104). Subsequently, the end point detection unit 68 detects the end point in the current adjustment method (step S105).

Subsequently, the determination unit 62 determines whether the end point detection unit 68 has normally detected the end point in the current adjustment method (step S106). For example, the determination unit 62 determines that the end point is not normally detected when the end point is not detected even after a prescribed time.

If the determination unit 62 determines that the end point is normally detected by the end point detection unit 68 (step S106, Yes), the process ends.

On the other hand, if the determination unit 62 determines that the end point is not normally detected by the end point detection unit 68 (step S106, No), the polishing condition of the polishing process in execution is saved as the specific polishing condition in, for example, the storage unit 66 (step S107), and the process ends. That is, the polishing condition in the polishing process is registered as an adjustment target of the current control parameter. Therefore, the current control parameter is adjusted when the polishing process is subsequently executed under the polishing condition. Even if the current control parameter is adjusted in step S103, the end point may not be normally detected when the adjustment is insufficient, for example. In this case, when the polishing process is executed next time under the polishing condition, the current control parameter is adjusted more than in the adjustment of the last time. For example, the amount of increase in the control gain of the feedback control in the speed compensator 104 is greater than the amount of increase in the adjustment of the last time.

Figure 9:
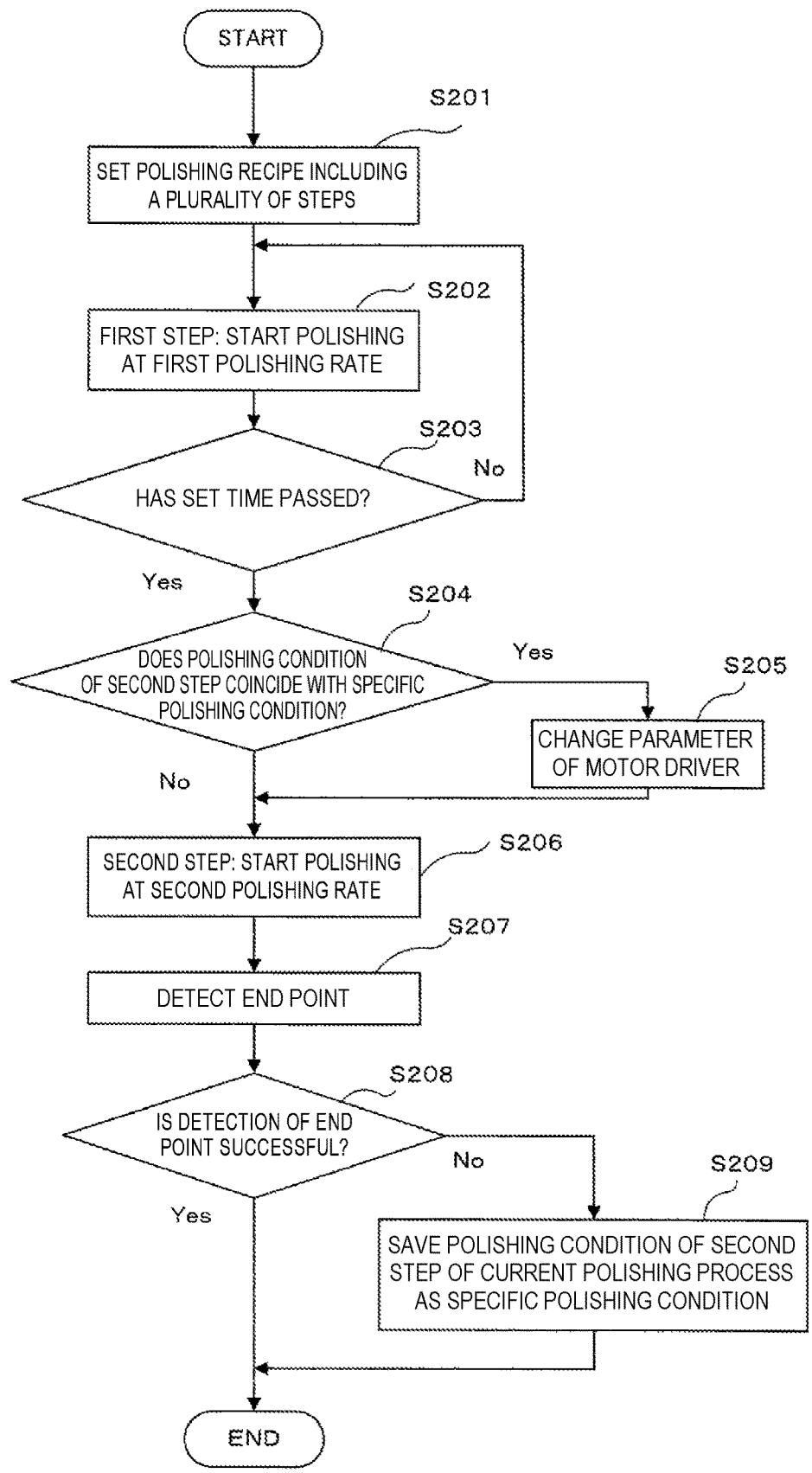
FIG. 9 is a flowchart of a current adjustment method by the polishing apparatus of the first and second embodiments.

FIG. 9 is a flowchart of a current adjustment method by the polishing apparatus of the first and second embodiments. FIG. 9 is a flowchart of the current adjustment method when the polishing process includes a plurality of stages. FIG. 9 illustrates an example of a case in which the polishing process includes a first stage of polishing the semiconductor wafer 18 at a first polishing rate and a second stage of polishing the semiconductor wafer 18 after the first stage at a second polishing rate smaller than the first polishing rate. Note that the polishing process including a plurality of stages is not limited to this example, and the polishing process can be arbitrarily selected. The stages of adjusting the current control parameter are not limited to this example, and the stages can be arbitrarily selected.

A polishing recipe of the polishing process including a plurality of stages is first set in the current adjustment method (step S201). Subsequently, polishing of the semiconductor wafer 18 is started at the first polishing rate in the current adjustment method (step S202). Subsequently, whether a preset time has passed is determined in the current adjustment method (step S203). If it is determined that the preset time has not passed in the current adjustment method (step S203, No), the process returns to step S202.

On the other hand, if it is determined that the preset time has passed in the current adjustment method (step S203, Yes), whether the polishing condition (for example, a combination of the type of the semiconductor wafer 18 and the type of the polishing recipe) of the second stage coincides with the specific polishing condition is determined (step S204). For example, the operator of the polishing apparatus may make the determination, or the determination unit 62 may make the determination based on the specific polishing condition stored in the storage unit 66.

If it is determined that the polishing condition of the second stage coincides with the specific polishing condition (step S204, Yes), the adjustment unit 64 adjusts the current control parameter of the motor driver 100 (step S205).

On the other hand, if it is determined that the polishing condition of the second stage does not coincide with the specific polishing condition (step S204, No), the current control parameter of the motor driver 100 is not adjusted.

Subsequently, polishing of the semiconductor wafer 18 is started at the second polishing rate in the current adjustment method (step S206). Subsequently, the end point detection unit 68 detects the end point in the current adjustment method (step S207).

Subsequently, the determination unit 62 determines whether the end point is normally detected by the end point detection unit 68 in the current adjustment method (step S208). For example, the determination unit 62 determines that the end point is not normally detected when the end point is not detected even after a prescribed time.

If the determination unit 62 determines that the end point is normally detected by the end point detection unit 68 (step S208, Yes), the process ends.

On the other hand, if the determination unit 62 determines that the end point is not normally detected by the end point detection unit 68 (step S208, No), the polishing condition of the second stage of the polishing process in execution is saved as the specific polishing condition in, for example, the storage unit 66 (step S209), and the process ends.

As described, according to the polishing apparatus and the current adjustment methods of the first and second embodiments, the current control parameter is adjusted only under the specific polishing condition. Therefore, the current control parameter is not adjusted under the polishing condition that allows detecting the end point based on normal setting of the current control parameter, and the existing polishing recipe and the like are not affected. According to the polishing apparatus and the current adjustment methods of the first and second embodiments, the current control parameter in the motor driver 100 is adjusted when it is determined that the polishing condition of the polishing process coincides with the specific polishing condition, and the change in the drive current when the driving load of the first electric motor 14 or the second electric motor 22 is changed can be increased. As a result, according to the polishing apparatus and the current adjustment methods of the first and second embodiments, the change in the torque current can be favorably detected without changing the existing polishing recipe. Therefore, the accuracy of the polishing end point detection is improved, and the end point detection unit 68 can appropriately detect the end point based on the change in the drive current.

Next, a polishing apparatus according to another embodiment of the present invention will be described with reference to the drawings. First, a basic configuration of the polishing apparatus will be described, and then detection of the polishing end point of the polishing target will be described. The description of the same parts as in the embodiments described above will not be repeated.

Figure 10:
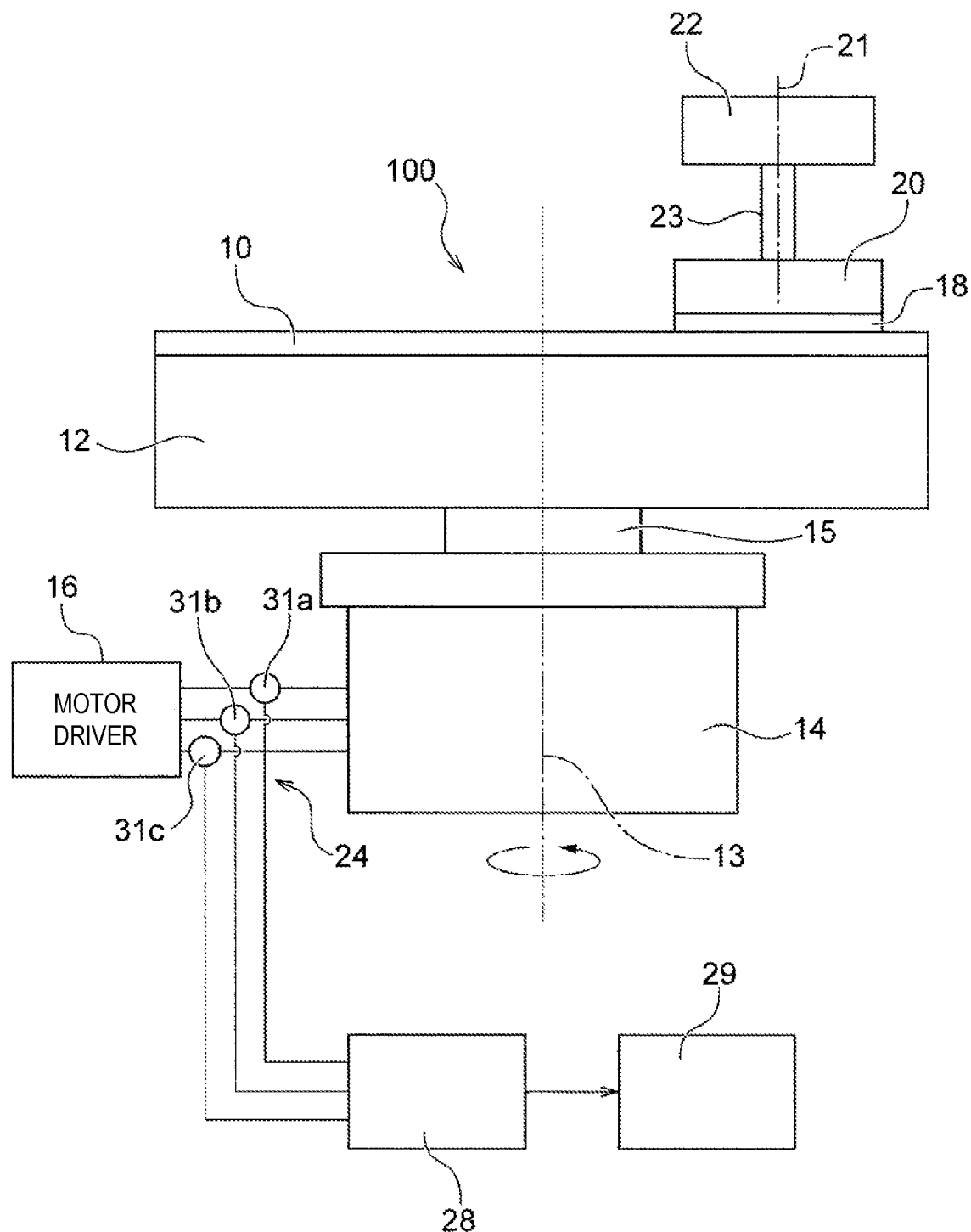
FIG. 10 is a view that illustrates the basic configuration of a polishing apparatus according to another embodiment.

FIG. 10 is a view illustrating the basic configuration of a polishing apparatus 100a according to the present embodiment. The polishing apparatus 100a includes a polishing table 12 to which a polishing pad 10 can be attached to the top face thereof, a first electric motor 14 that rotationally drives the polishing table 12, a top ring (holding unit) 20 that is capable of holding a semiconductor wafer (polishing target) 18, and a second electric motor 22 that rotationally drives a top ring 20.

Note that, in the present embodiment, a motor other than a three-phase motor, such as a two-phase motor or a five-phase motor can also be applied. Further, a motor other than an AC servo motor, for example, a brushless DC motor can be applied.

The polishing apparatus 100a also includes a motor driver 16 that rotationally drives the first electric motor 14. Note that, although only the motor driver 16 that rotationally drives the first electric motor 14 is illustrated in FIG. 10, the second electric motor 22 is also connected to a similar motor driver. The motor driver 16 outputs an alternating current for each of the U-phase, V-phase and W-phase, and rotationally drives the first electric motor 14 by means of this three-phase alternating current.

The polishing apparatus 100a has a current detection portion 24 that detects a three-phase alternating current that the motor driver 16 outputs, a rectification operation portion 28 that rectifies current detection values of three phases that are detected by the current detection portion 24, and adds the rectified signals of the three phases and outputs the resultant signal, and an endpoint detection portion 29 that detects a polishing endpoint that indicates the end of polishing of the surface of the semiconductor wafer 18 based on a change in the output of the rectification operation portion 28. Although the rectification operation portion 28 of the present embodiment performs only processing that adds signals of three phases, the rectification operation portion 28 may also perform multiplication after adding the signals. A configuration may also be adopted in which the rectification operation portion 28 performs only multiplication.

The current detection portion 24 includes current sensors 31a, 31b and 31c for the U-phase, V-phase and W-phase, respectively, to detect the three-phase alternating current that the motor driver 16 outputs. The current sensors 31a, 31b and 31c are provided on current paths for the U-phase, V-phase and W-phase between the motor driver 16 and the first electric motor 14, respectively. The current sensors 31a, 31b and 31c detect U-phase, V-phase and W-phase currents, respectively, and output the detected values to the rectification operation portion 28. Note that, a configuration may also be adopted in which the current sensors 31a, 31b and 31c are provided on current paths for the U-phase, V-phase and W-phase between an unshown motor driver and the second electric motor 22.

In the present embodiment, the current sensors 31a, 31b and 31c are Hall element sensors. The Hall element sensors are provided on the U-phase, V-phase and W-phase current paths, respectively. Magnetic fluxes that are proportional to the respective currents of the U-phase, V-phase and W-phase are converted to Hall voltages 32a, 32b and 32c by the Hall effect and the voltages are then output.

The current sensors 31a, 31b and 31c may be sensors that adopt a different method which can measure a current. For example, a current transformer method may be adopted that detects a current by means of secondary windings that are wound around ring-shaped cores (primary windings) that are provided on each of the U-phase, V-phase and W-phase current paths. In this case, output currents can be detected as voltage signals by causing the output currents to flow to load resistances.

Figure 11:
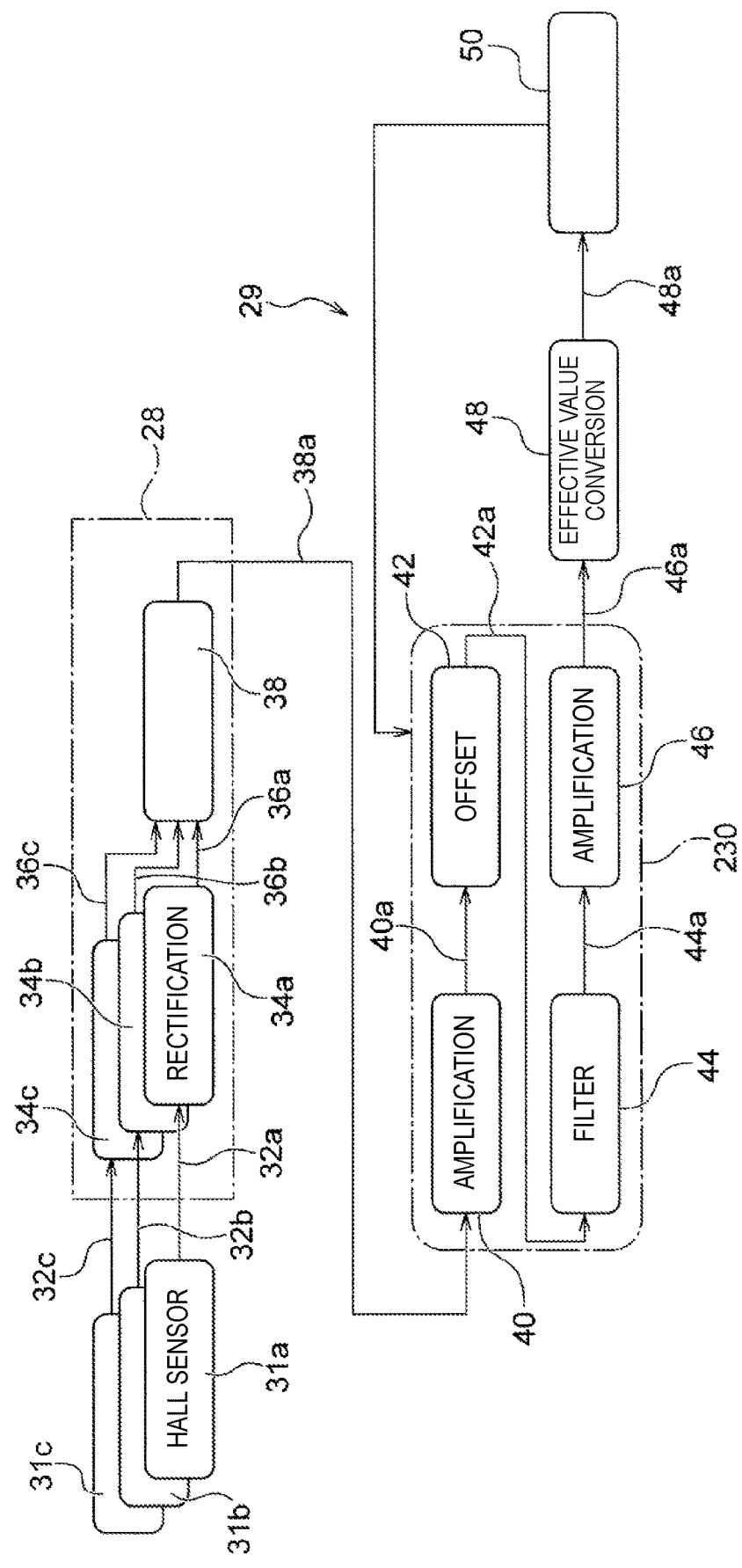
FIG. 11 is a block diagram illustrating details of an endpoint detection portion 29.
Figure 12:
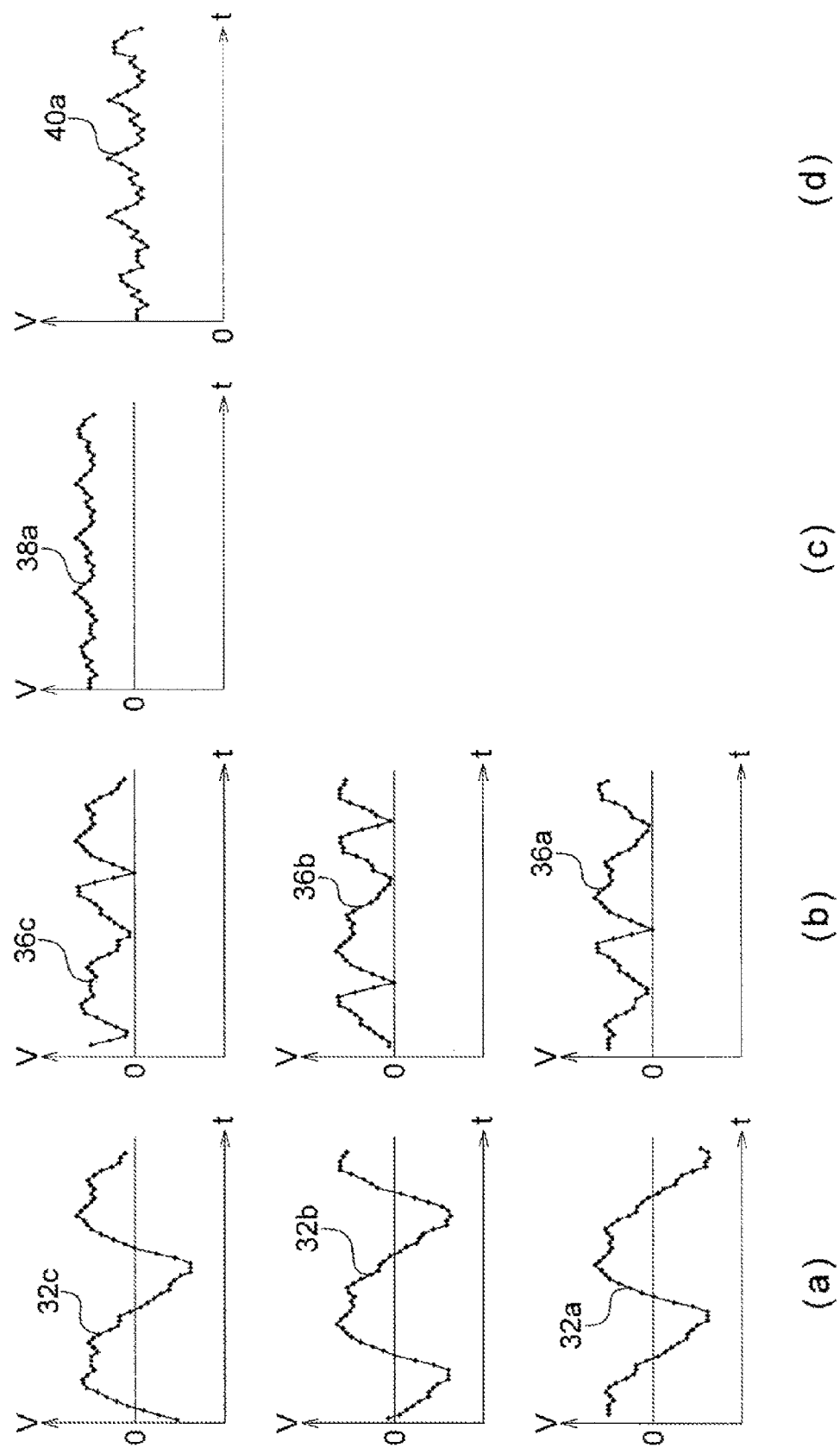
FIG. 12 is a multiple view drawing showing graphs that illustrate the contents of signal processing by the endpoint detection portion 29.

The rectification operation portion 28 rectifies the outputs of the plurality of current sensors 31a, 31b and 31c, and adds the rectified signals together. The endpoint detection portion 29 includes a processing portion 230 that processes the output of the rectification operation portion 28, an effective value converter 48 that subjects the output of the processing portion 230 to effective value conversion, and a control portion 50 that performs an operation to determine a polishing endpoint and the like. The details of the rectification operation portion 28 and the endpoint detection portion 29 will now be described with reference to FIGS. 11 to 4. FIG. 11 is a block diagram that illustrates the details of the rectification operation portion 28 and the endpoint detection portion 29. FIGS. 12 and 4 are graphs that illustrate the contents of signal processing by the rectification operation portion 28 and the endpoint detection portion 29.

The rectification operation portion 28 includes rectification portions 34a, 34b and 34c which rectify the output voltages 32a, 32b and 32c that are input from the plurality of current sensors 31a, 31b and 31c, and an operation portion 38 that adds together rectified signals 36a, 36b and 36c. Since the current value increases as a result of the addition, the detection accuracy improves. Note that, in the description of the embodiment, a signal wire and a signal that flows through the relevant signal wire are denoted by the same reference characters.

Although in the present embodiment, the output voltages 32a, 32b and 32c that are added are voltages for three phases, the present invention is not limited thereto. For example, output voltages for two phases may be added. Further, a configuration may be adopted in which output voltages for three phases or two phases of the first electric motor 22 are added, and endpoint detection is performed using the resultant value. In addition, a configuration may be adopted in which an output voltage for one phase or more of the first electric motor 14 and an output voltage for one phase or more of the second electric motor 22 are added.

FIG. 12(a) illustrates the output voltages 32a, 32b and 32c of the current sensors 31a, 31b and 31c. FIG. 12(b) illustrates the voltage signals 36a, 36b and 36c that are rectified and output by the rectification portions 34a, 34b and 34c, respectively. FIG. 12(c) illustrates a signal 38a that the operation portion 38 obtained by addition and then output. The horizontal axis in these graphs represents time and the vertical axis represents voltage.

The processing portion 230 includes an amplification portion 40 that amplifies an output 38a of the rectification operation portion 28, an offset portion (subtraction portion) 42 that subtracts a predetermined amount from the output of the rectification operation portion 28, a filter (noise removal portion) 44 that removes noise included in the output 38a of the rectification operation portion 28, and the second amplification portion 46 that further amplifies the signal from which noise was removed by the noise removal portion. In the processing portion 230, a signal 40a that was amplified by the amplification portion 40 is subjected to a subtraction operation at the offset portion 44, and the filter 44 then removes noise from a signal 42a obtained after the subtraction operation.

Figure 13:
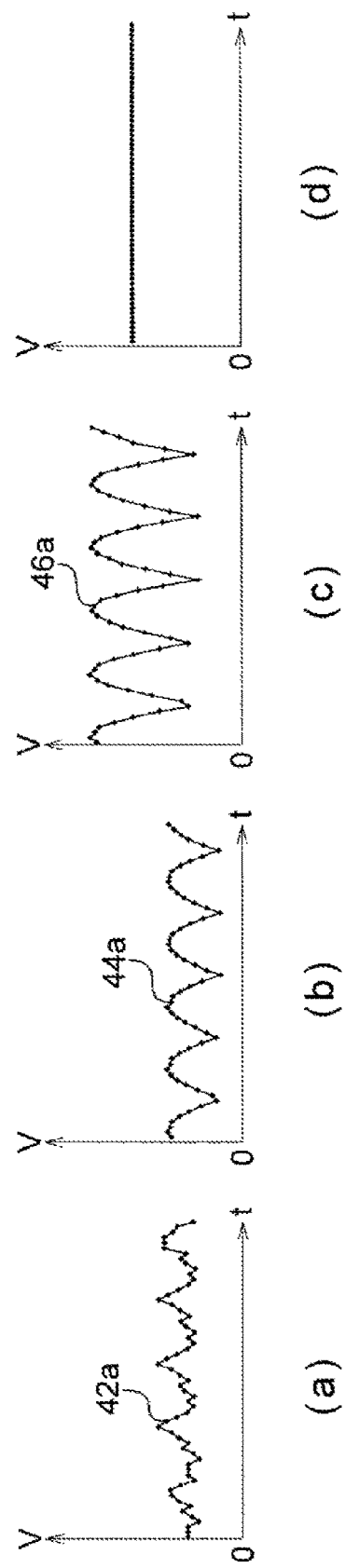
FIG. 13 is a multiple view drawing showing graphs that illustrate the contents of signal processing by the endpoint detection portion 29.

FIG. 12(d) illustrates the signal 40a that the amplification portion 40 amplifies and outputs. FIG. 13(a) illustrates the signal 42a that the offset portion 42 obtains by performing a subtraction operation on the signal 40a and outputs. FIG. 13(b) illustrates a signal 44a that the filter 44 obtains by removing noise included in the signal 42a and outputs. FIG. 13(c) illustrates a signal 46a that the second amplification portion 46 outputs that is obtained by further amplifying the signal 44a from which noise was removed. The horizontal axis in these graphs represents time, and the vertical axis represents voltage.

The amplification portion 40 is a portion that controls the amplitude of the output 38a of the rectification operation portion 28, and amplifies the amplitude of the output 38a by an amplification factor of a predetermined amount to increase the amplitude. The offset portion 42 extracts and processes a current part that depends on a change in a frictional force by removing a current part (bias) of a fixed amount that does not change even if the frictional force changes. By this means, the accuracy of the endpoint detection method that detects an endpoint based on a change in the frictional force improves.

The offset portion 42 subtracts only an amount to be deleted of the signal 40a that the amplification portion 40 outputs. A current that is detected usually includes a current part that changes accompanying a change in the frictional force, and a current part (bias) of a fixed amount that does not change even if the frictional force changes. This bias is the amount to be removed. By removing the bias, it is possible to extract only the current part that depends on a change in the frictional force and to amplify the resultant signal to the maximum amplitude in accordance with an input range of the effective value converter 48 at a subsequent stage, and thus the accuracy of the endpoint detection improves.

The filter 44 reduces unwanted noise that is included in the signal 42a that is input, and is normally a low-pass filter. The filter 44, for example, is a filter that allows only a frequency component that is lower than the rotational frequency of the motor to pass therethrough. This is because endpoint detection can be performed if there is only a direct-current component. The filter 44 may be a band-pass filter that allows a frequency component that is lower than the rotational frequency of the motor to pass therethrough. This is because endpoint detection can be performed in this case also.

The second amplification portion 46 is a component for adjusting the amplitude in accordance with the input range of the effective value converter 48 that is at a subsequent stage. The reason for adjusting the amplitude in accordance with the input range of the effective value converter 48 is that the input range of the effective value converter 48 is not infinite and also because it is desirable for the amplitude to be as large as possible. Note that, when the input range of the effective value converter 48 is increased, the resolution when subjecting the converted signal to analog/digital conversion by the A/D converter deteriorates. For these reasons, the input range with respect to input to the effective value converter 48 is kept at the optimal range by the second amplification portion 46.

An output 46a of the second amplification portion 46 is input to the effective value converter 48. The effective value converter 48 is a component that determines the mean during one alternating voltage cycle, that is, a direct-current voltage that is equal to the alternating voltage. An output 48a of the effective value converter 48 is shown in FIG. 13(d).

The horizontal axis in this graph represents time, and the vertical axis represents voltage.

The output 48a of the effective value converter 48 is input to the control portion 50. The control portion 50 performs endpoint detection based on the output 48a. The control portion 50 determines that polishing of the semiconductor wafer 18 reached the endpoint in a case where a previously set condition is satisfied, such as a case where any one of the following conditions is satisfied. That is, the control portion 50 determines that polishing of the semiconductor wafer 18 reached the endpoint in a case where the output 48a became greater than a previously set threshold value, a case where the output 48a became less than a previously set threshold value, or a case where a time differential value of the output 48a satisfied a predetermined condition.

Figure 14:
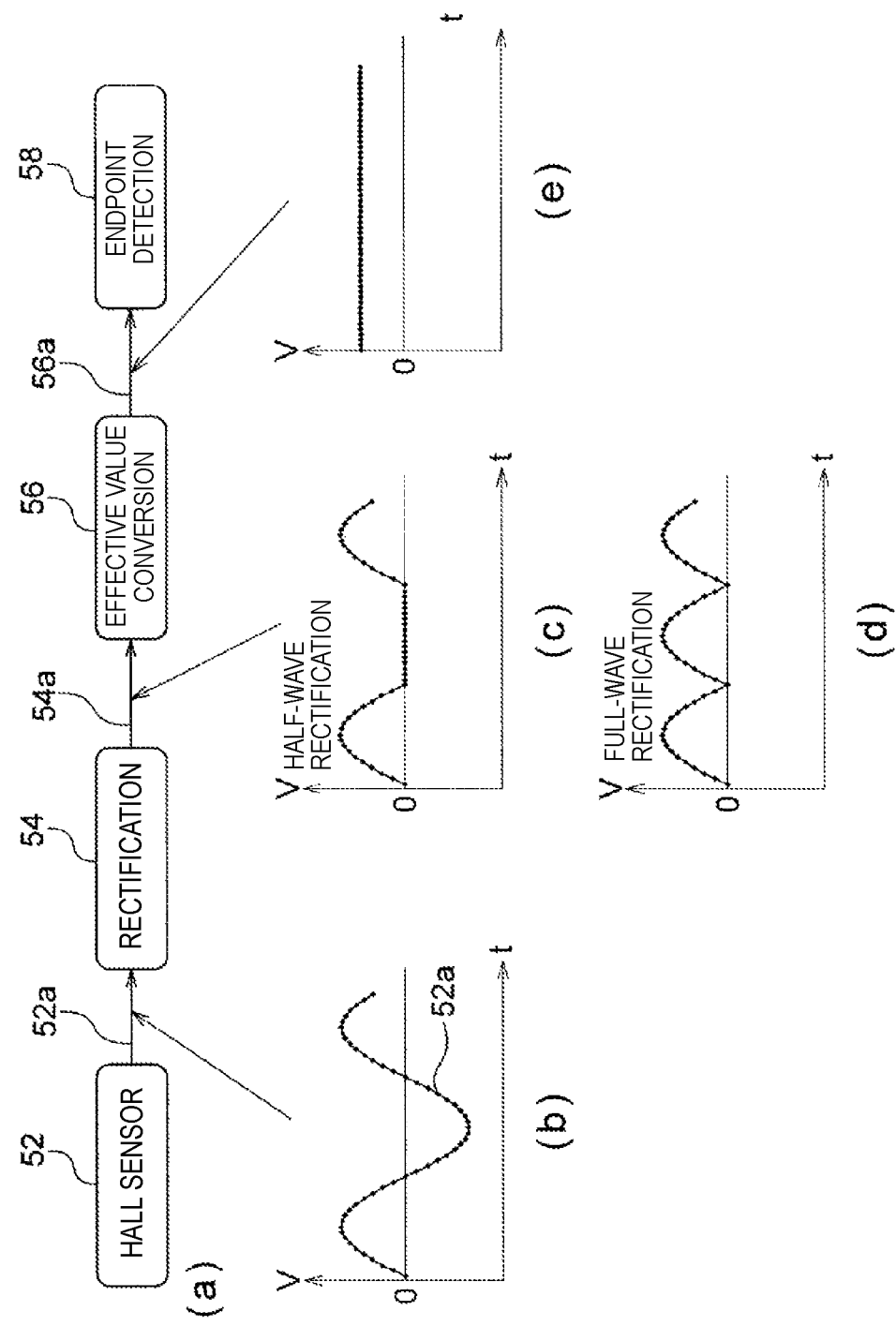
FIG. 14 is a multiple view drawing showing a block diagram and graphs that illustrate an endpoint detection method of a comparative example.

The effects of the present embodiment will now be described in contrast with a comparative example that uses current of a single phase only. FIG. 14 is a multiple view drawing showing a block diagram and graphs that illustrate an endpoint detection method of the comparative example. The purpose of the graphs shown in FIG. 14 is to illustrate the principles of the detection method, and the signals illustrated in the graphs are signals in a case where there is no noise. The horizontal axis in these graphs represents time, and the vertical axis represents voltage. In the comparative example, since only current of a single phase is used, there is no processing for addition. Processing for subtraction is also not performed. In FIG. 11 and FIG. 14, the Hall element sensor 31a and the Hall element sensor 52, the rectification portion 34a and the rectification portion 54, and the effective value converter 48 and the effective value converter 56 have equivalent performance to each other, respectively.

In the comparative example there is a single Hall element sensor 52 which is provided, for example, on the U-phase current path, and which converts a magnetic flux that is proportional to the U-phase current to a Hall voltage 52a and outputs the Hall voltage 52a to a signal wire 52a. The Hall voltage 52a is illustrated in FIG. 14(a). The output voltage 52a of the Hall element sensor 52 is input to the rectification portion 54. The rectification portion 54 rectifies the output voltage 52a and outputs the rectified voltage as a signal 54a. The rectification is half-wave rectification or full-wave rectification. The signal 54a in a case where half-wave rectification is performed is illustrated in FIG. 14(c), and the signal 54a in a case where full-wave rectification is performed is illustrated in FIG. 14(d).

The output 54a is input to the effective value converter 56. The effective value converter 56 determines the mean during one alternating voltage cycle. An output 56a of the effective value converter 56 is illustrated in FIG. 14(e). The output 56a of the effective value converter 56 is input to the endpoint detection portion 58. The endpoint detection portion 58 performs endpoint detection based on the output 56a.

Figure 15:
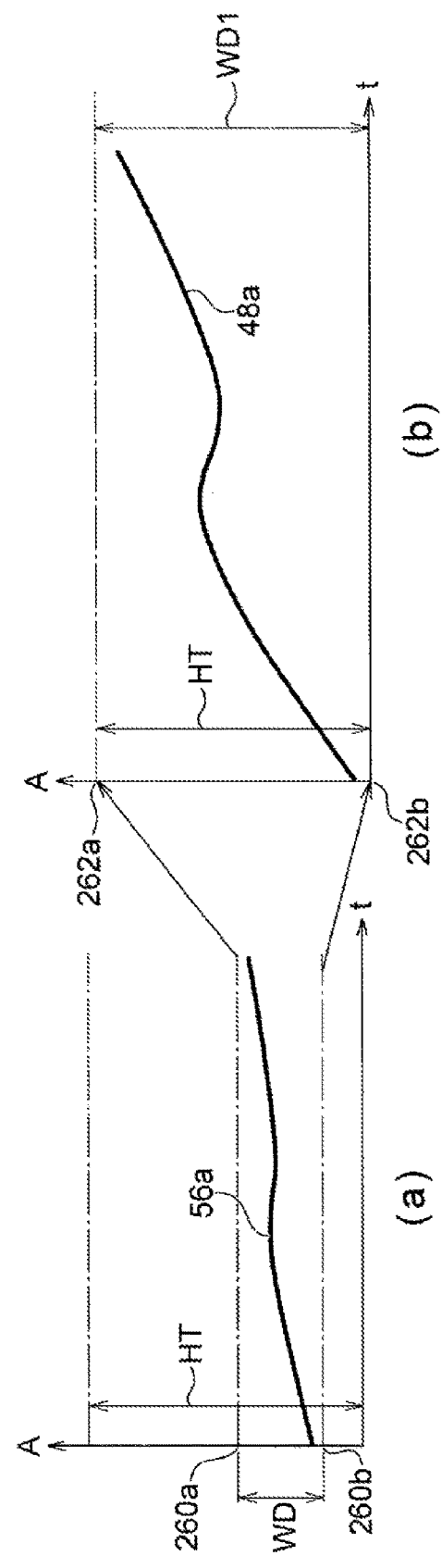

A comparison between a processing result of the comparative example and a processing result of the present embodiment is illustrated in FIG. 15. FIG. 15A is a graph that illustrates the output 56a of the effective value converter 56 of the comparative example. FIG. 15B is a graph that illustrates the output 48a of the effective value converter 48 of the present embodiment. In these graphs, the horizontal axis represents time and the vertical axis represents the output voltage of the relevant effective value converter that is converted to a corresponding driving current. Based on FIG. 15, it will be understood that the change in the current increases according to the present embodiment. A range HT in FIG. 15 represents a range within which input to the effective value converters 48 and 56 is possible. A level 260a of the comparative example corresponds to a level 262a of the present embodiment, and a level 260b of the comparative example corresponds to a level 262b of the present embodiment.

In the comparative example, a change range WD (=level 260a−level 260b) of the driving current 56a is much smaller than the range HT within which input is possible. According to the present embodiment, the driving current 48a is processed by the processing portion 230 so that the change range WD1 (=level 260a−level 260b) of the driving current 48a becomes approximately equal to the range HT within which input is possible. As a result, the change range WD1 of the driving current 48a is much larger than the change range WD of the comparative example. According to the present embodiment, even in a case where a change in the torque current is small, the change in the torque current is favorably detected and the accuracy of polishing endpoint detection improves.

Figure 16:
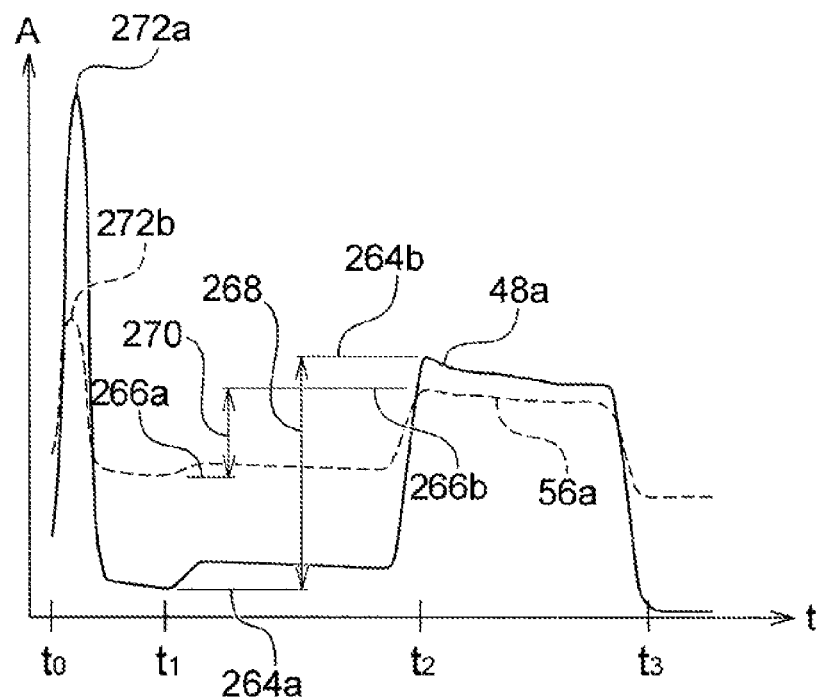
FIG. 16 is a graph illustrating the output 56a of the effective value converter 56 of the comparative example, and the output 48a of the effective value converter 48 of the embodiment.

Results of processing in the comparative example and the present embodiment are illustrated by separate graphs in FIG. 16 which shows a comparison of the results. FIG. 16 is a graph illustrating the output 56a of the effective value converter 56 of the comparative example, and the output 48a of the effective value converter 48 of the present embodiment. In the graph, the horizontal axis represents time and the vertical axis represents the output voltage of the relevant effective value converter that is converted to a corresponding driving current. In the present drawing, the polishing target is different to the polishing target in FIG. 15. FIG. 16 shows the manner in which the output voltage of the relevant effective value converter changes from a polishing starting time point t1 until a polishing ending time point t3.

As is apparent from FIG. 16, a change amount in the output 48a of the effective value converter 48 of the present embodiment is larger than a change amount in the output 56a of the effective value converter 56 of the comparative example. The output 48a and the output 56a each exhibit a lowest value 264a and 266a, respectively, at a time t1, and each exhibit a highest value 264b and 266b, respectively, at a time t2. A change amount 268 (=264b−264a) in the output 48a of the effective value converter 48 is significantly larger than a change amount 270 (=266b−266a) in the output 56a of the effective value converter 56 of the comparative example. Note that, although peak values 272a and 272b represent current values that are larger than the highest values 264b and 266b, the peak values 272a and 272b are ascribable to noise that arises in an initial stage until polishing stabilizes.

Figure 17:
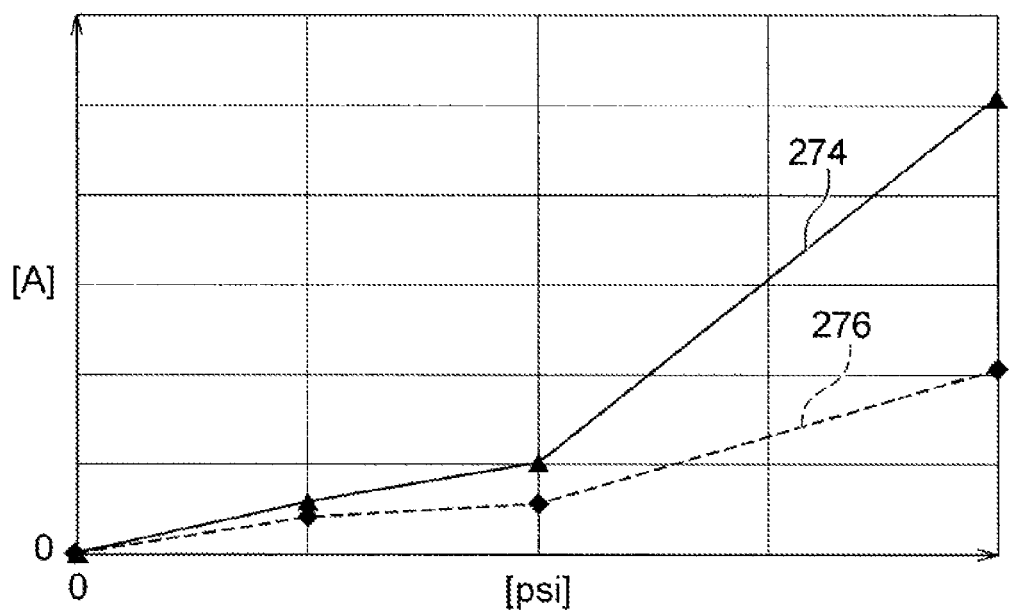
FIG. 17 is a graph illustrating changes in a change amount 270 of the output 56a of the comparative example and changes in a change amount 268 of the output 48a the present embodiment with respect to a pressure applied to a semiconductor wafer 18.

The change amounts 268 and 270 illustrated in FIG. 16 depend on a pressure when the semiconductor wafer 18 is pressed against the polishing pad 10 in a state in which the top ring 20 is being rotationally driven by the second electric motor 22. The change amounts 268 and 270 increase as the aforementioned pressure increases. This is illustrated in FIG. 17. FIG. 17 is a graph that illustrates changes in the change amount 270 of the output 56a of the comparative example and a change amount 268 of the output 48a of the present embodiment with respect to a pressure applied to the semiconductor wafer 18. The horizontal axis in the graph represents a pressure applied to the semiconductor wafer 18, and the vertical axis represents the output voltage of the effective value converter that is converted to a corresponding driving current. A curved line 274 is obtained by plotting the change amount 268 in the output 48a of the present embodiment with respect to the pressure. A curved line 276 is obtained by plotting the change amount 270 in the output 56a of the comparative example with respect to the pressure.

When the pressure is 0, that is, when polishing is not being performed, the current is 0. As will be understood from the present drawing, the change amount 268 in the output 48*a* of the effective value converter 48 of the present embodiment is greater than the change amount 270 in the output 56*a* of the effective value converter 56 of the comparative example, and the difference between the curved line 274 and the curved line 276 is more noticeable as the pressure increases.

Next, control of the amplification portion 40, the offset portion 42, the filter 44 and the second amplification portion 46 by the control portion 50 will be described. The control portion 50 controls amplification characteristics (an amplification factor and a frequency characteristic and the like) of the amplification portion 40, noise removal characteristics (a pass band and attenuation amount of a signal and the like) of the filter 44, subtraction characteristics (a subtraction amount and a frequency characteristic and the like) of the offset portion 42, and amplification characteristics (an amplification factor and a frequency characteristic and the like) of the second amplification portion 46.

The specific control method is as follows. When changing characteristics of the respective portions described above to control the respective portions, the control portion 50 sends data that shows an instruction to change circuit characteristics to each of the above described portions by digital communication (USB (Universal Serial Bus), LAN (Local Area Network), RS-232 or the like).

Each portion that receives the data changes settings relating to the characteristics in accordance with the data. The changing method involves changing settings such as a resistance value of a resistance, a capacitance value of a capacitor, or an inductance of an inductor or the like constituting an analog circuit of the respective portions. Switching a resistance or the like using an analog SW may be mentioned as a specific method for changing. Alternatively, after a digital signal is converted to an analog signal by a DA converter, settings are changed by switching a plurality of resistances or the like by means of an analog signal, or a variable resistance or the like is rotated by a small motor. A method may also be adopted in which a plurality of circuits are provided in advance, and the plurality of circuits are switched.

Various kinds of data are available as the contents of the data that is sent. For example, a method may be adopted in which a number is sent, and the respective portions that receive the number select a resistance or the like that corresponds to the number that is received. Alternatively, a method may be adopted in which a value that corresponds to the size of a resistance value or an inductance is sent, and the size of a resistance value or an inductance is set in detail in accordance with the relevant value.

Methods other than digital communication are also possible. For example, it is also possible to adopt a method in which signal wires are provided that directly connect the control portion 50 and the amplification portion 40, the offset portion 42, the filter 44 and the second amplification portion 46, and resistances and the like inside the respective portions are switched using the signal wires.

Figures 18, 19:
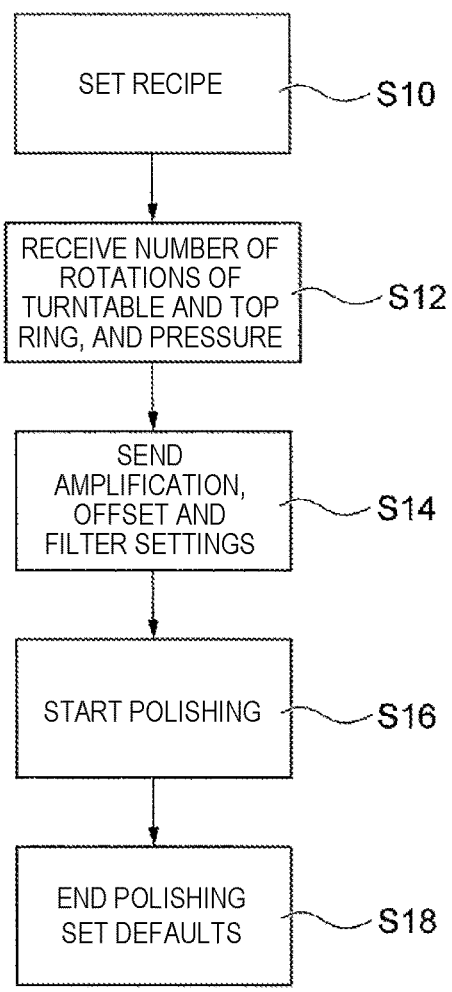
FIG. 18 illustrates an example of settings of an amplification portion 40, an offset portion 42, a filter 44 and a second amplification portion 46.
FIG. 19 is a flowchart illustrating an example of control of respective portions by a control portion 50.

One example in which the respective portions are set by the control portion 50 will now be described referring to FIG. 18. FIG. 18 illustrates an example of setting the amplification portion 40, the offset portion 42, the filter 44 and the second amplification portion 46. In this example, the input range of the effective value converter 48 is from 0 A (ampere) to 100 A, that is, the input range is 100 A. The maximum value of the waveform of the output signal 38*a* of the rectification operation portion 28 is 20 A, and the minimum value is 10 A. That is, the variation width (amplitude) in the output signal 38*a* of the rectification operation portion 28 is not more than 10 A (=20 A−10 A), and the lower limit of the signal 38*a* is 10 A.

In such a case, since the amplitude of the amount of change in the output signal 38*a* is 10 A, and the input range of the effective value converter 48 is 100 A, a setting value 278*a* of the amplification factor of the amplification portion 40 is set to 10 times (=100 A/10 A). As the result of amplification, a maximum value 278*b* of the waveform of the output signal 38*a* is 200 A, and a minimum value 278*c* thereof is 100 A.

With respect to the subtraction amount at the offset portion 42, since 10 A that is the lower limit of the signal 38*a* is amplified by the amplification portion 40 and becomes 100 A, the offset portion 42 subtracts 100 A. Accordingly, a setting value 278*d* for the subtraction amount at the offset portion 42 is −100 A. As the result of the subtraction, a maximum value 278*e* of the waveform of the output signal 38*a* is 100 A and a minimum value 278*f* thereof is 0 A.

In the example illustrated in FIG. 18, with regard to the filter 44, the state thereof does not change from the initial settings, and therefore a setting value 278*g* is left blank. As the result of the filter processing, a maximum value 278*h* of the waveform of the output signal 38*a* is attenuated to a value lower than 100 A in accordance with the filter characteristics, and a minimum value 278*i* of the waveform of the output signal 38*a* is 0 A. This is because, in the case illustrated in FIG. 18, the filter 44 has a characteristic that maintains the output at 0 A when the input is 0 A. The purpose of the second amplification portion 46 is to correct the amount that was attenuated by the filter 44. A setting value 278*j* of the amplification factor of the second amplification portion 46 is set to a value that can correct the amount that was attenuated by the filter 44. As a result of the second amplification, a maximum value 278*k* of the waveform of the output signal 38*a* is 100 A, and a minimum value 278*l* thereof is 0 A.

Next, one example of the control of the respective portions by the control portion 50 will be further described by means of FIG. 19. FIG. 19 is a flowchart illustrating one example of control of the respective portions by the control portion 50. When starting polishing, information relating to a polishing recipe (information that defines polishing conditions with respect to a substrate surface, such as a pressing pressure distribution, a polishing time period and the like) is input to the control portion 50 by an operator of the polishing apparatus 100*a* or from an unshown management apparatus of the polishing apparatus 100*a* (step 10).

The reason for using a polishing recipe is as follows. When performing multi-stage polishing processes in succession with respect to a plurality of substrates such as semiconductor wafers, the surface state, such as the film thickness, of each substrate surface is measured before polishing, or between the polishing processes of each stage, or after polishing. This is done so as to feed back values obtained by the measurement and optimally correct (update) the polishing recipe for the next substrate or for a substrate to be polished after an arbitrary number of substrates.

The contents of the polishing recipe are as follows: (1) Information relating to whether or not the control portion 50 is to change settings of the amplification portion 40, the offset portion 42, the filter 44 and the second amplification portion 46. In the case of changing the settings, the communication setting with each portion is enabled. On the other hand, in a case where the settings are not to be changed, the communication setting with each portion is disabled. In a case where the communication setting is disabled, values that are set by default are enabled at each portion. (2) Information relating to the input range of the effective value converter 48. (3) Information indicating a variation width (amplitude) in the output signal 38a of the rectification operation portion 28 by means of a maximum value and a minimum value, or information indicating the variation width. This information is also referred to as "torque range". (4) Information relating to settings of the filter 44. For example, in the case illustrated in FIG. 18, the settings are set to the default settings. (5) Information relating to whether or not to reflect polishing information, for example, information relating to the number of rotations of the table in the control.

Next, in accordance with information in the polishing recipe relating to whether or not to reflect polishing information in the control, in a case where the setting is to reflect the polishing information in the control, the control portion 50 receives information regarding the number of rotations of the polishing table 12 and the top ring 20 as well as a pressure to be applied by the top ring 20, from the unshown management apparatus of the polishing apparatus 100a (step 12). The reason for receiving this information is that in some cases ripples arise due to the influence of the pressure, the number of rotations of the table, and a number of rotations ratio between the number of rotations of the table and the number of rotations of the top ring, and it is necessary to perform filter settings in accordance with the ripple frequency.

Next, in a case where the communication setting is enabled, the control portion 50 determines setting values for the amplification portion 40, the offset portion 42, the filter 44 and the second amplification portion 46 in accordance with the polishing recipe and the information received in step 12. The determined setting values are sent to the respective portions by digital communication (step 14). In a case where the communication setting is disabled, the default setting values are set at the amplification portion 40, the offset portion 42, the filter 44 and the second amplification portion 46.

Polishing is started after setting of the relevant setting values at the respective portions finishes. During the polishing the control portion 50 receives a signal from the effective value converter 48 and continues to perform a determination regarding the polishing endpoint (step 16).

If the control portion 50 determines the polishing endpoint based on the signal from the effective value converter 48, the control portion 50 sends information indicating that the polishing endpoint was detected to the unshown management apparatus of the polishing apparatus 100a. The management apparatus ends the polishing (step 18). After polishing ends, the default setting values are set at the amplification portion 40, the offset portion 42, the filter 44 and the second amplification portion 46.

According to the present embodiment, because data of three phases is rectified and added, and furthermore, waveform amplification is performed, there is the advantageous effect that a difference in the output of the current that accompanies a torque change increases. Further, since the characteristics of the amplification portion and the like can be changed, the output difference can be further increased. Furthermore, noise is reduced because a filter is used.

REFERENCE SIGNS LIST

10 polishing pad
12 polishing table
14 first electric motor (drive unit)
18 semiconductor wafer (polishing target)
20 top ring (holding unit)
22 second electric motor (drive unit)
31 current sensor (current detection unit)
60 end point detection apparatus
62 determination unit
64 adjustment unit
66 storage unit
68 end point detection unit
100 motor driver
104 speed compensator
200 input unit

The invention claimed is:

1. A polishing apparatus that polishes a surface of a polishing target, the polishing apparatus comprising:
   a first electric motor that rotates and drives a polishing table that holds a polishing pad; and
   a second electric motor that rotates and drives a holding unit that holds the polishing target and presses the polishing target against the polishing pad, wherein
   at least one of the first and second electric motors includes a winding wire that carries current with a plurality of phases,
   wherein current with a first number of phases flows through the first electric motor and current with a second number of phases flows through the second electric motor, wherein a sum of the first number of phases and the second number of phases is at least three phases and
   the polishing apparatus comprises: a current detection unit that detects currents of at least two phases of the at least three phases;
   a rectification arithmetic unit that rectifies current detection values of the at least two phases detected by the current detection unit, wherein the rectification arithmetic unit adds up the at least two rectified signals, and outputs the added signal; and
   an end point detection unit that detects a polishing end point indicating an end of polishing of the surface of the polishing target based on a change in the output of the rectification arithmetic unit,
   wherein the end point detection unit comprises: an amplification unit that amplifies the output of the rectification arithmetic unit a noise removal unit that removes noise included in the output of the rectification arithmetic unit and a subtraction unit that subtracts a prescribed amount from the output of the rectification arithmetic unit,
   wherein the subtraction unit performs the subtraction for a signal amplified by the amplification unit, and the noise removal unit removes the noise from the signal subjected to the subtraction.

2. The polishing apparatus according to claim 1, wherein the end point detection unit comprises a second amplification unit that further amplifies the signal from which the noise is removed by the noise removal unit.

3. The polishing apparatus according to claim 1, wherein the end point detection unit comprises the amplification unit and a control unit that controls amplification characteristics of the amplification unit.

4. The polishing apparatus according to claim 1, wherein the end point detection unit comprises the noise removal unit and a control unit that controls noise removal characteristics of the noise removal unit.

5. The polishing apparatus according to claim 1, wherein the end point detection unit comprises the subtraction unit and a control unit that controls subtraction characteristics of the subtraction unit.

6. The polishing apparatus according to claim 2, wherein the end point detection unit comprises a control unit that controls amplification characteristics of the second amplification unit.

7. A polishing method of polishing a surface of a polishing target by using a polishing apparatus, the polishing apparatus comprising: a first electric motor that rotates and drives a polishing table that holds a polishing pad; and a second electric motor that rotates and drives a holding unit that holds the polishing target and presses the polishing target against the polishing pad, wherein at least one of the first and second electric motors includes a winding wire that carries current with a plurality of phases, wherein current with a first number of phases flows through the first electric motor and current with a second number of phases flows through the second electric motor, wherein a sum of the first number of phases and the second number of phases is at least three phases, the method comprising:

a current detection step of detecting currents of at least two phases of the at least three phases;

a rectification arithmetic step of rectifying current detection values of the at least two detected phases, adding up the at least two rectified signals, and outputting the added signal; and an end point detection step of detecting a polishing end point indicating an end of polishing of the surface of the polishing target based on a change in the output in the rectification arithmetic step, wherein the end point detection step comprises an amplification step of amplifying the output in the rectification arithmetic step; a noise removal step of removing noise included in the output in the rectification arithmetic step; and a subtraction step of subtracting a prescribed amount from the output in the rectification arithmetic step, wherein in the end point detection step, the subtraction of the prescribed amount is performed in the subtraction step for a signal amplified in the amplification step, and the noise is removed in the noise removal step from the signal subjected to the subtraction.

8. The polishing method according to claim 7, wherein the end point detection step further comprises a second amplification step of further amplifying the signal from which the noise is removed in the noise removal step.

* * * * *